United States Patent
Zhong

(10) Patent No.: US 9,776,652 B2
(45) Date of Patent: Oct. 3, 2017

(54) STROLLER FRAME

(71) Applicant: Wonderland Nurserygoods Company Limited, N.T. (HK)

(72) Inventor: Zhi-Ren Zhong, Guangdong (CN)

(73) Assignee: Wonderland Nurserygoods Company Limited, NT (HK)

( * ) Notice: Subject to any disclaimer, the term of this patent is extended or adjusted under 35 U.S.C. 154(b) by 0 days.

(21) Appl. No.: 15/014,040

(22) Filed: Feb. 3, 2016

(65) Prior Publication Data
US 2016/0229439 A1   Aug. 11, 2016

(30) Foreign Application Priority Data

Feb. 11, 2015 (CN) .......................... 2015 1 0075511

(51) Int. Cl.
| | |
|---|---|
| *B62B 7/10* | (2006.01) |
| *B62B 7/00* | (2006.01) |
| *B62B 7/14* | (2006.01) |
| *B62B 9/10* | (2006.01) |
| *B62B 9/26* | (2006.01) |

(52) U.S. Cl.
CPC ................ *B62B 7/008* (2013.01); *B62B 7/10* (2013.01); *B62B 7/14* (2013.01); *B62B 9/102* (2013.01); *B62B 9/26* (2013.01); *B62B 2205/22* (2013.01)

(58) Field of Classification Search
CPC .......... B62B 7/008; B62B 7/10; B62B 7/105; B62B 7/14; B62B 7/062; B62B 7/064; B62B 9/102; B62B 9/26; B62B 2205/22
See application file for complete search history.

(56) References Cited

U.S. PATENT DOCUMENTS

| | | | | |
|---|---|---|---|---|
| 3,235,279 A | * | 2/1966 | Smith ..................... | B62B 7/008 280/648 |
| 5,823,564 A | * | 10/1998 | Kettler ..................... | B62B 7/10 280/642 |
| 8,262,107 B2 | * | 9/2012 | Tuckey ..................... | B62B 9/18 267/5 |
| 8,696,016 B2 | * | 4/2014 | Homan ................... | B62B 7/105 280/47.34 |

(Continued)

FOREIGN PATENT DOCUMENTS

| | | |
|---|---|---|
| CN | 104340255 A | 2/2015 |
| CN | 204527258 U | 8/2015 |

*Primary Examiner* — Hau Phan
*Assistant Examiner* — Jacob Meyer
(74) *Attorney, Agent, or Firm* — Winston Hsu

(57) ABSTRACT

A stroller frame includes a bottom pipe, a rear foot, a handle, a carrier device, and a linking component. The rear foot is pivoted to the bottom pipe and the handle. A rear end of the carrier device is detachably connected to the rear foot. The linking component is pivotally bendable. Two opposite ends of the linking component are pivoted to the handle and the bottom pipe respectively. A middle portion of the linking component is pivoted to the rear foot. A front end of the carrier device is pivoted to the linking component in an engageable manner, and the linking component drives the carrier device to be folded when the stroller frame is folded. Therefore, the stroller frame can be folded into a smaller size easily, which is convenience for storage and transportation. Furthermore, depending on different situations, the carrier device can be detached from the stroller frame.

28 Claims, 22 Drawing Sheets

(56) References Cited

U.S. PATENT DOCUMENTS

| | | | |
|---|---|---|---|
| 8,783,708 B2 * | 7/2014 | Storm | B62B 7/10 |
| | | | 280/47.38 |
| 8,827,283 B2 * | 9/2014 | Homan | B62B 7/105 |
| | | | 248/503.1 |
| 9,050,993 B2 * | 6/2015 | Pollack | B62B 9/12 |
| 9,056,622 B2 * | 6/2015 | Thomas | B62B 7/008 |
| 9,221,486 B2 * | 12/2015 | Fine | B62B 5/0003 |
| 9,327,750 B2 * | 5/2016 | Yi | B62B 3/022 |
| 2008/0029983 A1 * | 2/2008 | Yang | B62B 7/062 |
| | | | 280/47.38 |
| 2010/0013281 A1 * | 1/2010 | Chen | B62B 7/14 |
| | | | 297/243 |
| 2010/0102535 A1 * | 4/2010 | Zhong | B62B 7/123 |
| | | | 280/650 |
| 2011/0241313 A1 * | 10/2011 | Homan | B62B 7/105 |
| | | | 280/647 |
| 2011/0241395 A1 * | 10/2011 | Homan | B62B 7/105 |
| | | | 297/250.1 |
| 2012/0056408 A1 * | 3/2012 | Wu | B62B 7/068 |
| | | | 280/642 |
| 2012/0319382 A1 * | 12/2012 | Lin | B62B 7/10 |
| | | | 280/647 |

\* cited by examiner

STROLLER FRAME

BACKGROUND OF THE INVENTION

1. Field of the Invention

The present invention relates to a stroller, and more particularly, to a stroller frame with easy operation and reduced folded size.

2. Description of the Prior Art

Strollers have been widely used in families with infants. In order to satisfy consumers' demands for portability of strollers, strollers are usually designed to be foldable. In such a way, the strollers can be unfolded when the strollers are in use, and the strollers can be folded for easy storage and transportation when the strollers are not in use.

There is a conventional stroller capable of allowing parents to look after two infants at the same time. This conventional stroller includes two seats disposed on a frame of the stroller in a left-right direction or a front-back direction. Therefore, structure of this conventional stroller is more complicated than structure of a regular stroller. When it is desired to folded this conventional stroller, it has to detach the two seats from the frame before folding the stroller, which is inconvenience in use. Furthermore, it has to find a place to store the two seats detached from the frame, which is inconvenience in storage and transportation.

Therefore, there is a need to design a stroller with easy operation and reduced folded size, to solve the above-mentioned problem.

SUMMARY OF THE INVENTION

In order to solve the aforementioned drawbacks, the present invention is to provide a stroller frame capable of being folded without detaching a carrier device, such as a seat, therefrom and has advantages of easy operation and reduced folded size.

According to the claim invention, a stroller frame includes a bottom pipe, a rear foot, a handle, a carrier device, and a linking component. The rear foot is pivoted to the bottom pipe. The handle is pivoted to the rear foot. A rear end of the carrier device is detachably connected to the rear foot. The linking component is pivotally bendable. Two opposite ends of the linking component are pivoted to the handle and the bottom pipe respectively. A middle portion of the linking component is pivoted to the rear foot. A front end of the carrier device is pivoted to the linking component in an engageable manner. The linking component drives the carrier device to be folded when the stroller frame is folded.

Preferably, the linking component expands between the bottom pipe and the handle when the stroller frame is unfolded. The linking component is pivotally bent to drive the carrier device to rotate during a period that the stroller frame rotates to be folded. The bottom pipe, the rear foot, the handle, and the carrier device are substantially parallel to one another when the stroller frame is folded.

Preferably, an upper end of the rear foot is pivoted to a lower end of the handle at a first pivoting point. A lower end of the rear foot is pivoted to a rear end of the bottom pipe at a second pivoting point. The linking component is pivoted to the handle, the rear foot, and the bottom pipe at a third pivoting point, a fourth pivoting point, and a fifth pivoting point respectively. The third pivoting point and the fourth pivoting point are located between the first pivoting point and the second pivoting point when the stroller frame is completed folded.

Preferably, the linking component further includes a first linking pipe, a second linking pipe, and a third linking pipe. An upper end of the first linking pipe is pivoted to the handle. The second linking pipe is pivoted to the first linking pipe and the rear foot, and the second linking pipe is further pivoted to the carrier device in an engageable manner.

The third linking pipe is pivoted to the second linking pipe. A lower end of the third linking pipe is pivoted to the bottom pipe.

Preferably, a lower end of the second linking pipe is formed in a curved shape and pivoted to the carrier device at a sixth pivoting point in an engageable manner. When the stroller frame is unfolded, the linking component is formed in a straight line, and the sixth pivoting point is located in front of the linking component.

Preferably, the carrier device intersects with the rear foot and the linking component when the stroller frame is unfolded.

Preferably, the stroller frame further includes a connecting column protruding from the linking component. A connecting slot is formed on the carrier device and located at a position corresponding to the connecting column. The connecting slot is pivoted to the connecting column in an engageable manner.

Preferably, the stroller frame further includes an engaging assembly disposed on the carrier device. The engaging assembly includes an engaging component slidably protruding into the connecting slot for detachably engaging with the connecting column.

Preferably, the engaging assembly further includes a resilient component disposed between the engaging component and the carrier device for recovering the engaging component resiliently.

Preferably, the engaging assembly further includes an operating component connected to the carrier device and the engaging component for driving the engaging component to slide.

Preferably, the engaging component includes a connecting body and an engaging hook disposed on an end of the connecting body. The connecting body is slidably received in the carrier device and connected to the operating component. The engaging hook protrudes into the connecting slot for detachably engaging with the connecting column.

Preferably, the operating component is slidably sleeved on the carrier device.

Preferably, the operating component includes a releasing grip and a driving block connected to each other cooperatively. The driving block is connected to the engaging component. The releasing grip is rotatably connected to the carrier device for driving the driving block to slide.

Preferably, a recess is formed on the driving block and substantially perpendicular to a sliding direction of the driving block. The releasing grip includes a protruding rib intersecting with the recess by a predetermined angle. The recess engages with the protruding rib.

Preferably, the operating component further includes a fixing block fixed on the carrier device. A receiving slot is formed on the fixing block. The releasing grip is rotatably received in the receiving slot. The driving block is slidably disposed inside the fixing block.

Preferably, the stroller frame further includes a positioning pin and an angle adjusting assembly. The positioning pin protrudes from the rear foot. The angle adjusting assembly is disposed on the carrier device and located at a position corresponding to the positioning pin. The angle adjusting assembly and the positioning pin are adjustably connected to each other for adjusting an angle of the carrier device.

Preferably, the angle adjusting assembly further includes a positioning component and a plurality of engaging sections. The positioning component is slidably connected to the carrier device. The plurality of engaging sections is disposed on the positioning component. The positioning pin selectively and detachably engages with one of the plurality of engaging sections.

Preferably, the angle adjusting assembly further includes an operating grip connected to the positioning component for driving the positioning component to disengage from the positioning pin.

Preferably, the angle adjusting assembly further includes a first pulling component received in the carrier device, and two ends of the first pulling component are fixed to the operating grip and the positioning component respectively.

Preferably, the angle adjusting assembly further includes a first recovering component received in the carrier device and disposed between the positioning component and the carrier device for driving the positioning component to recover.

Preferably, the stroller frame further includes a positioning pin protruding from the rear foot and detachably supporting the rear end of the carrier device.

Preferably, the carrier device includes a supporting frame, a gripping handle, and a section adjusting assembly. The gripping handle is pivotally connected to the supporting frame. The section adjusting assembly is for positioning the gripping handle.

Preferably, the section adjusting assembly includes a first pivoting joint, a second pivoting joint, and a moving component. The first pivoting joint is fixed on the gripping handle. The second pivoting joint is disposed on the supporting frame. The moving component is slidably disposed between the first pivoting joint and the second pivoting joint and detachably engages with the second pivoting joint.

Preferably, the section adjusting assembly further includes an engaging protrusion disposed on the moving component. A plurality of engaging slots is spaced on an inner wall of the second pivoting joint at intervals. The engaging protrusion detachably engages with one of the plurality of engaging slots.

Preferably, the section adjusting assembly further includes a plurality of protruding teeth spaced on the inner wall of the second pivoting joint at intervals. Each of the plurality of engaging slots is formed between two corresponding adjacent protrusion teeth of the plurality of protruding teeth. The plurality of protruding teeth is for pushing the engaging protrusion to disengage from the corresponding engaging slot.

Preferably, a plurality of positioning slots is formed on the first pivoting joint and corresponding to the engaging protrusion. The engaging protrusion slidably engages with one of the plurality of positioning slots.

Preferably, the section adjusting assembly further includes a pivoting shaft disposed in the second pivoting joint. The moving component is slidably sleeved on the pivoting shaft.

Preferably, the section adjusting assembly further includes a second recovering component disposed between the first pivoting joint and the moving component for driving the moving component to recover.

In summary, the stroller frame of the present invention includes a bottom pipe, a rear foot, a handle, a carrier device, and a linking component. The rear foot is pivoted to the bottom pipe. The handle is pivoted to the rear foot. A rear end of the carrier device is detachably connected to the rear foot. The linking component is pivotally bendable. Two opposite ends of the linking component are pivoted to the handle and the bottom pipe respectively. A middle portion of the linking component is pivoted to the rear foot. A front end of the carrier device is pivoted to the linking component in an engageable manner. In such a way, the stroller frame utilizes the linking component to drive the carrier device to be folded when the stroller frame is folded. Therefore, the stroller frame of the present invention can be folded into a smaller size easily, which is convenience for storage and transportation. Furthermore, depending on different situations, the carrier device can be detached from the stroller frame.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
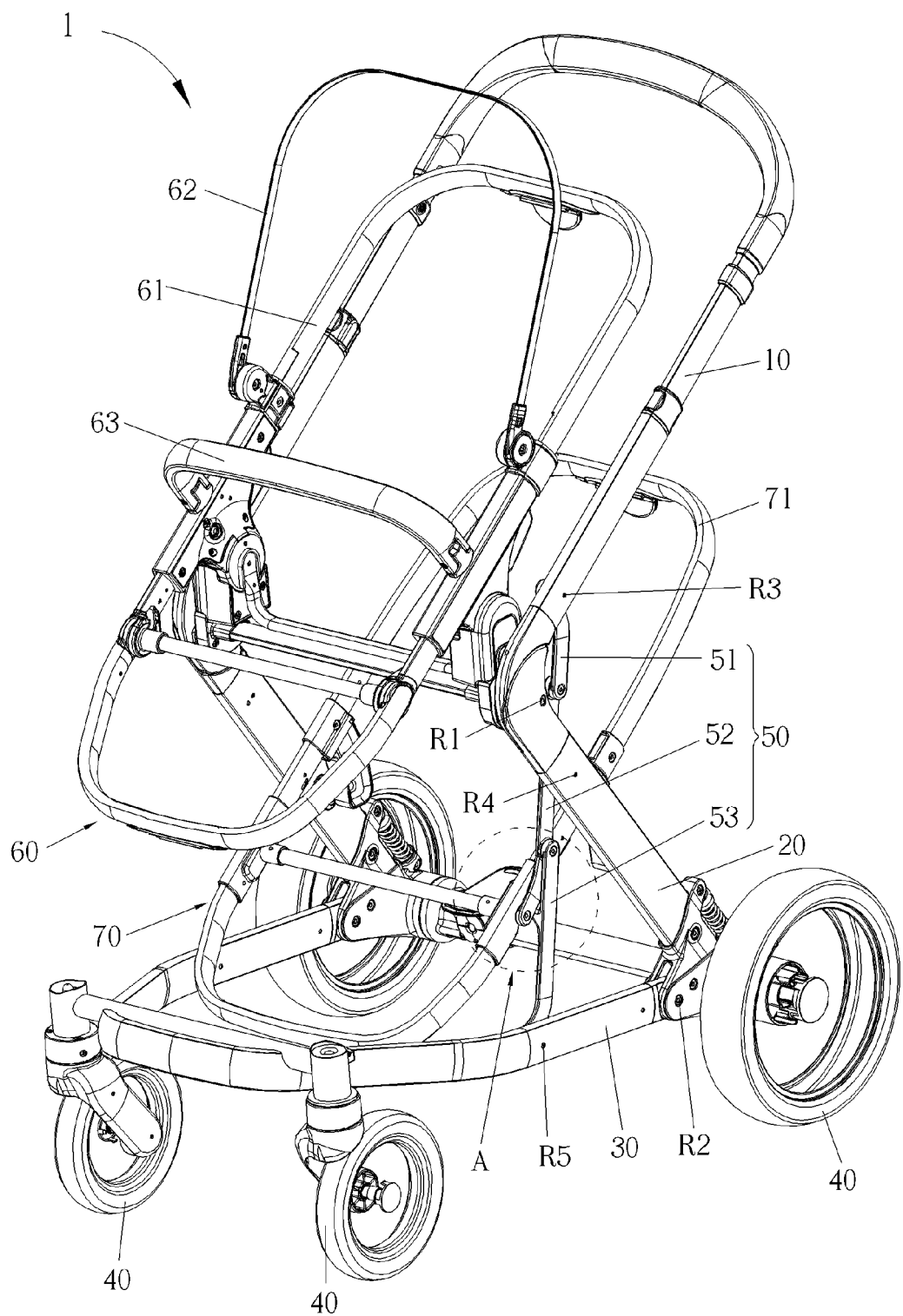
FIG. 1 is a schematic diagram of a stroller frame according to a first embodiment of the present invention.

Please refer to FIG. 1. FIG. 1 is a schematic diagram of a stroller frame 1 according to a first embodiment of the present invention. As shown in FIG. 1, the stroller frame 1 includes two handles 10, two rear feet 20, a bottom pipe 30, four wheels 40, at least one linking component 50, a first seat 60, and a carrier device. The two handles 10 are pivoted to the two rear feet 20 respectively. The two rear feet 20 are pivoted to the bottom pipe 30. Two of the four wheels 40 are disposed on a front side of the bottom pipe 30, and the other two of the four wheels 40 are disposed on a rear side of the bottom pipe 30. The linking component 50 is pivotally bendable. In this embodiment, the carrier device can be a second seat 70 detachably disposed between the two rear feet 20. However, the carrier device of present invention also can be a basket or any other supporting component in another embodiment. Furthermore, the number and the configuration of the linking component 50 are not limited to this embodiment. In other words, the stroller frame 1 also can include two linking components 50 disposed symmetrically.

Figure 2:
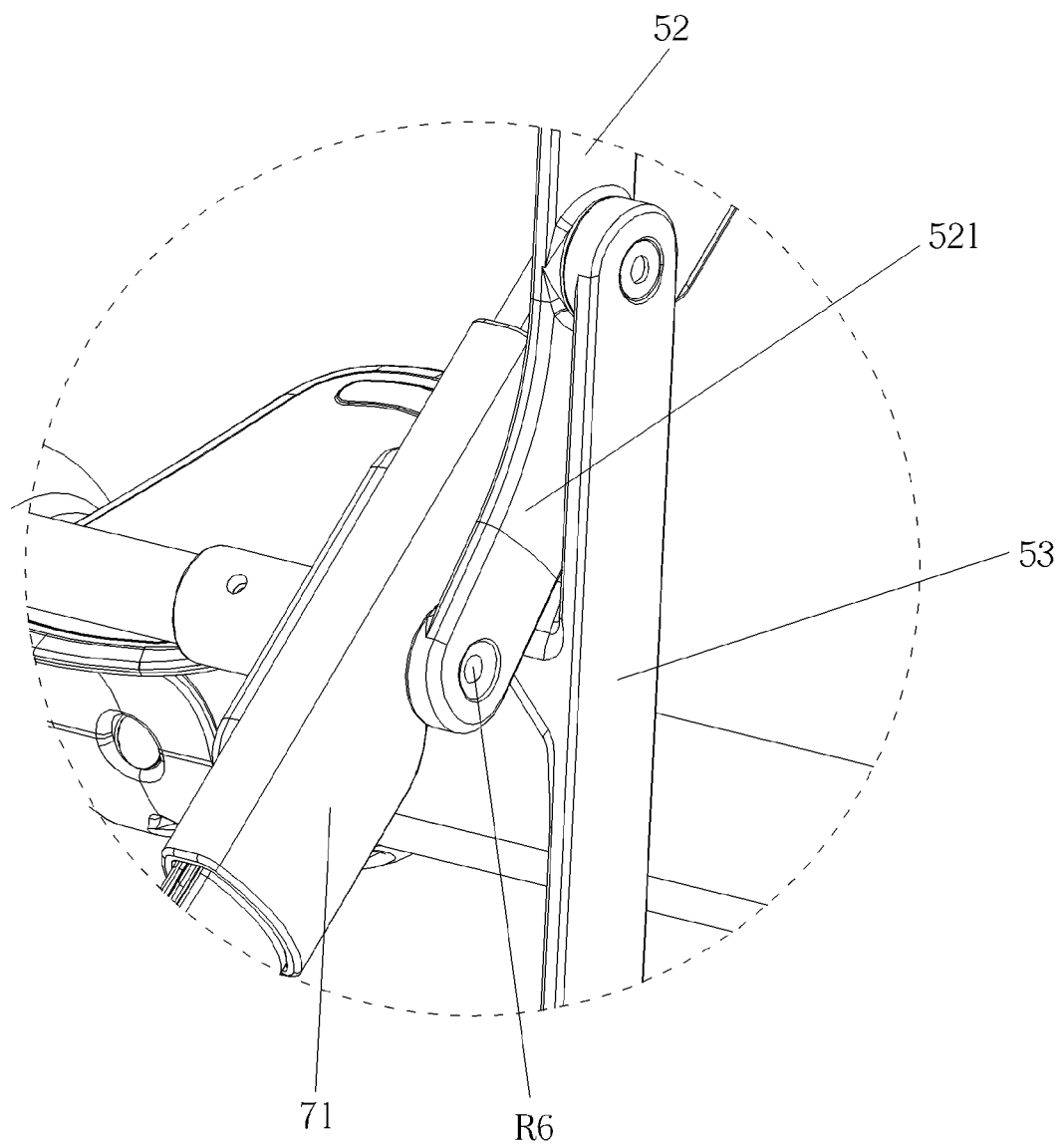
FIG. 2 is an enlarged diagram of an A portion of the stroller frame shown in FIG. 1 according to the first embodiment of the present invention.
Figure 3:
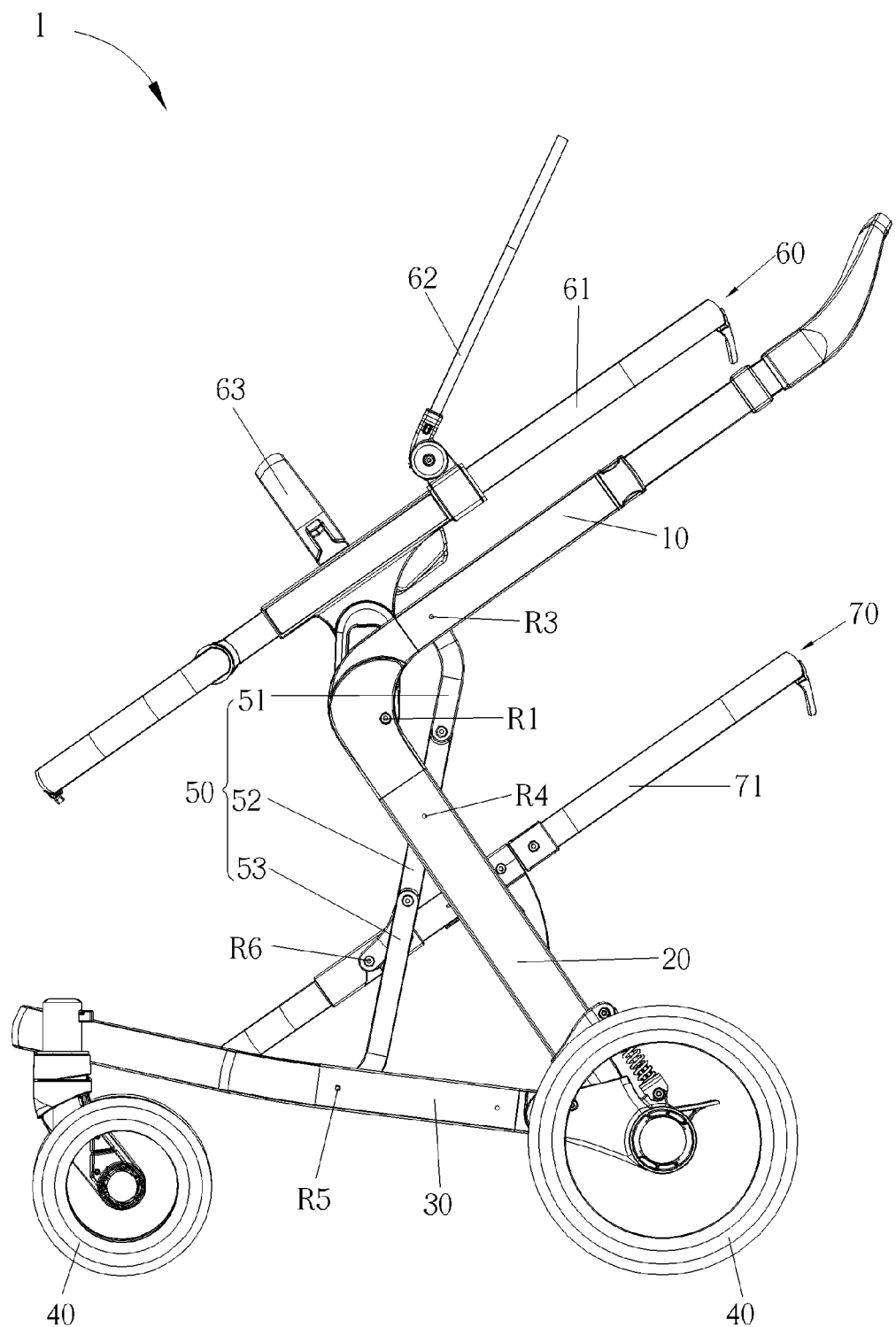
FIG. 3 is a lateral diagram of the stroller frame shown in FIG. 1 at an unfolding position according to the first embodiment of the present invention.
Figure 4:
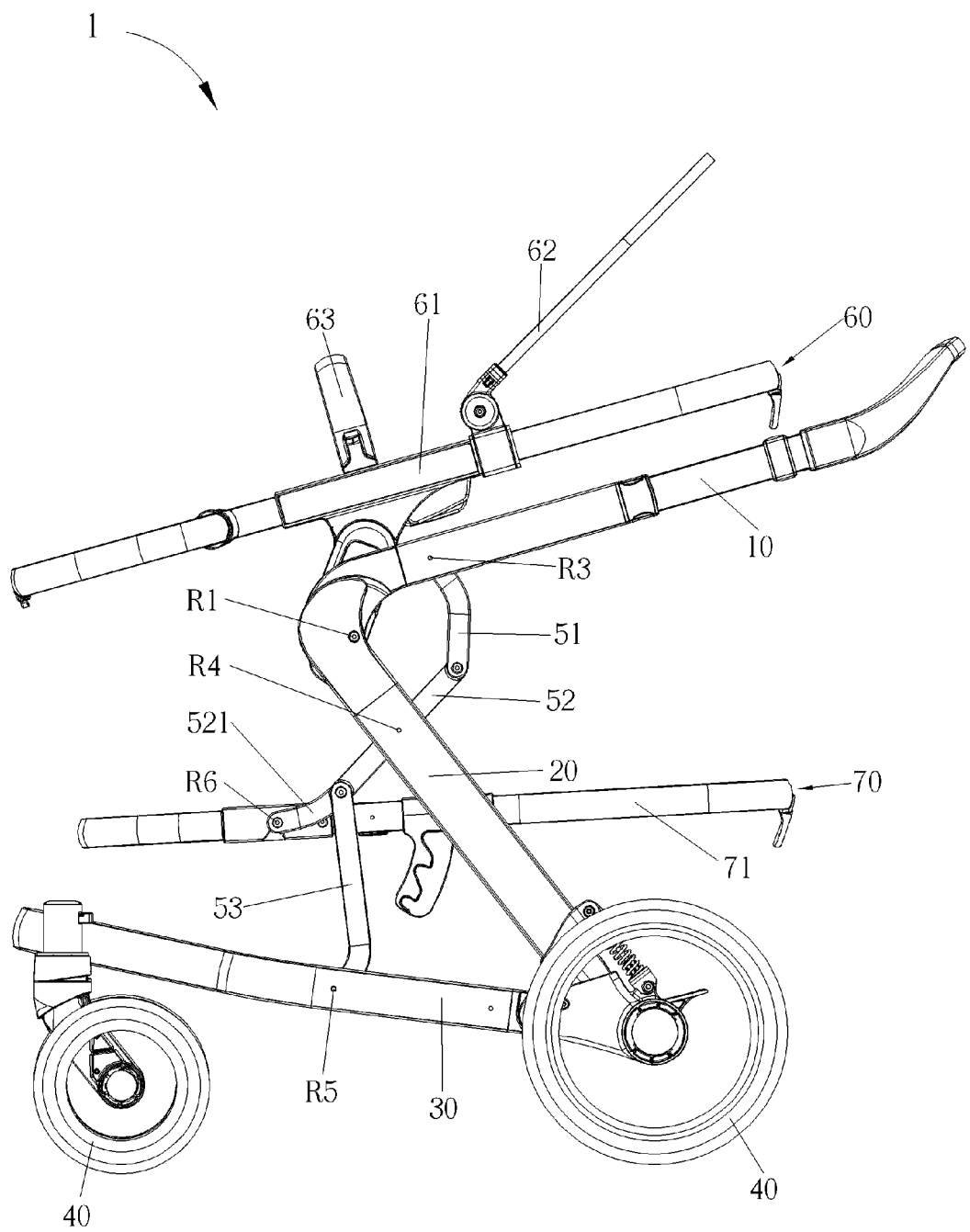
FIG. 4 is a lateral diagram of the stroller frame shown in FIG. 1 illustrating that the stroller frame is not folded completely according to the first embodiment of the present invention.
Figure 5:
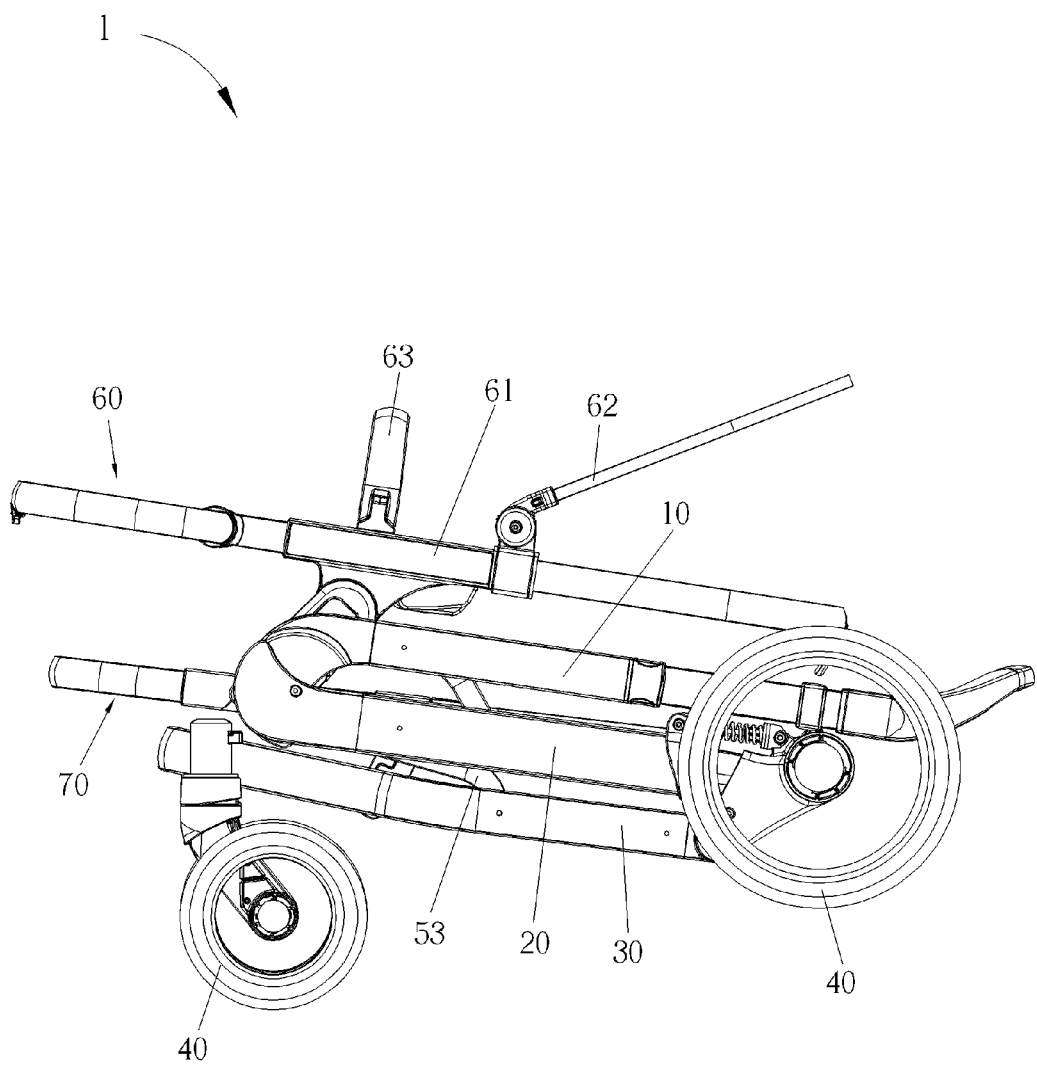
FIG. 5 is a lateral diagram of the stroller frame shown in FIG. 1 at a folding position according to the first embodiment of the present invention.

Please refer to FIG. 2 to FIG. 5. FIG. 2 is an enlarged diagram of an A portion of the stroller frame 1 shown in FIG. 1 according to the first embodiment of the present invention. FIG. 3 is a lateral diagram of the stroller frame 1 shown in FIG. 1 at an unfolding position according to the first embodiment of the present invention. FIG. 4 is a lateral diagram of the stroller frame 1 shown in FIG. 1 illustrating that the stroller frame 1 is not folded completely according to the first embodiment of the present invention. FIG. 5 is a lateral diagram of the stroller frame 1 shown in FIG. 1 at a folding position according to the first embodiment of the present invention. The first seat 60 is disposed on the two handles 10 and includes a frame 61, a supporting rod 62, and an armrest 63. The supporting rod 62 and the armrest 63 are disposed on the frame 61. The frame 61 is connected between the two handles 10. When the stroller frame 1 is at the unfolding position, as shown in FIG. 1, the frame 61 is substantially parallel to the two handles 10. However, it is not limited thereto, i.e., an angle of the first seat 60 relative to the two handles 10 is adjustable. When the stroller frame 1 is at the folding position, the first seat 60, the bottom pipe 30, the two rear feet 20, and the two handles 10 are substantially parallel to one another, as shown in FIG. 5.

For simplicity, the linking component 50 at one side of the stroller frame 1 is introduced as follows. In the case of the two symmetrical linking components 50, the other linking component 50 at another side of the stroller frame 1 can have the same structure and configuration as ones of the linking component 50 at the one side of the frame 1. As shown in FIG. 1 and FIG. 2, two ends of the linking component 50 are pivoted to one of the two handles 10 and the bottom pipe 30 respectively. A middle portion of the linking component 50 is pivoted to the corresponding rear foot 20 pivoted to the one of the two handles 10. A front end of the second seat 70 is pivoted to the linking component 50 in an engageable manner. A rear end of the second seat 70 adjustably engages with the two rear feet 20. The linking component 50 drives the second seat 70 to be folded when the stroller frame 1 is folded.

Specifically, the bottom pipe 30 is substantially a U-shaped structure. Lower ends of the two rear feet 20 are pivoted to a rear end of the bottom pipe 30. The two rear feet 20 obliquely extend to a front side of the stroller frame 1. Upper ends of the two rear feet 20 are pivoted to lower ends of the two handles 10 respectively. The two handles 10 obliquely extend to a rear side of the stroller frame 1. In this embodiment, the stroller frame 1 can further includes two locking components, which are not shown in figures respectively disposed between the two rear feet 20 and the two handles 10. When the stroller frame 1 is unfolded, the two locking components can lock the two handles 10 and the two rear feet 20. When the two locking components are released, the two handles 10 can rotate relative to the two rear feet 20, respectively.

As shown in FIG. 1 to FIG. 5, each of the lower ends of the two handles 10 is pivoted to the corresponding upper end of the two rear feet 20 at a first pivoting point R1. Each of the lower ends of the two rear feet 20 is pivoted to the rear end of the bottom pipe 30 at a second pivoting point R2. The linking component 50 intersects with the corresponding rear foot 20. The linking component 50 is pivoted to the corresponding handle 10, the corresponding rear foot 20, and the bottom pipe 30 at a third pivoting point R3, a fourth pivoting point R4, and a fifth pivoting point R5 respectively. The fifth pivoting point R5 is located in front of the first pivoting point R1. When the stroller frame 1 is at the unfolding position, the linking component 50 expands between the bottom pipe 30 and the corresponding handle 10. During a period that the stroller frame 1 is folded, the linking component 50 is pivotally bent to drive the second seat 70 to rotate. When the stroller frame 1 is at the folding position, the third pivoting point R3 and the fourth pivoting point R4 are located between the first pivoting point R1 and the second pivoting point R2, and the two handles 10, the two rear feet 20, the bottom pipe 30, the first seat 60, and the second seat 70 are substantially parallel to one another, as shown in FIG. 5.

Specifically, as shown in FIG. 1 to FIG. 4, the linking component 50 includes a first linking pipe 51, a second linking pipe 52, and a third linking pipe 53. The second linking pipe 52 is pivoted to the first linking pipe 51 and the third linking pipe 53. An upper end of the first linking pipe 51 is pivoted to the corresponding handle 10 at the third pivoting point R3. A middle portion of the second linking pipe 52 is pivoted to the corresponding rear foot 20 at the fourth pivoting point R4. A lower end of the third linking pipe 53 is pivoted to the bottom pipe 30 at the fifth pivoting point R5.

A bending portion 521 is bent from a lower end of the second linking pipe 52, as shown in FIG. 2 and FIG. 4. An upper end of the second linking pipe 52 is pivoted to the first linking pipe 51. The third linking pipe 53 is pivoted to the lower end of the second linking pipe 52 at a location near the bending portion 521. The bending portion 521 of the second linking pipe 52 is pivoted to the second seat 70 at a sixth pivoting point R6 in an engageable manner. When the stroller frame 1 is unfolded, the linking component 50 is formed in a straight line, and the sixth pivoting point R6 is located in front of the linking component 50. Furthermore, the fifth pivoting point R5 where the third linking pipe 53 is pivoted to the bottom pipe 30 is located in front of the first pivoting point R1 when the stroller frame 1 is unfolded.

Operational principle illustrating a folding process of the stroller frame 1 is described as follows. As shown in FIG. 1 and FIG. 3, the second seat 70 can be selectively disposed between the two rear feet 20 when the stroller frame 1 is in use. The first seat 60 and the second seat 70 are substantially parallel to the two handles 10. The linking component 50 intersects with the corresponding rear foot 20 and the second seat 70 and expands between the bottom pipe 30 and the corresponding handle 10. When it is desired to fold the stroller frame 1, the two handles 10 and the two rear feet 20 can be released to rotate relative to each other by operating the two locking components disposed therebetween, such that the two handles 10 can be pushed downwardly to rotate relative to the two rear feet 20 around the two first pivoting points R1. The two rear feet 20 rotate relative to the bottom pipe 30 around the two second pivoting points R2. As shown in FIG. 4, when the two handles 10 are pushed downwardly, the first seat 60 moves along with the two handles 10. The two handles 10 drive the first linking pipe 51 to rotate around the third pivoting point R3, such that the first linking pipe 51 and the third linking pipe 53 rotate relative to the second linking pipe 52, and the second linking pipe 52 rotates relative to the corresponding rear foot 20 around the fourth pivoting point R4. Since the lower end of the second linking pipe 52 is pivoted to the second seat 70 in an engageable manner, the second linking pipe 52 drives the second seat 70 to move simultaneously when the second linking pipe 52 rotates around the fourth pivoting point R4.

As shown in FIG. 5, when the stroller frame 1 is at the folding position, the two handles 10, the two rear feet 20, the bottom pipe 30, the first seat 60, and the second seat 70 are substantially parallel to one another, such that the stroller frame 1 has a smaller size after being folded, which saves storage space. Furthermore, during a period that the stroller frame 1 is folded, it is not required to detach the first seat 60 and the second seat 70 from the stroller frame 1, which is convenient for operation. However, the second seat 70 also can be detached from the stroller frame 1 before the stroller frame 1 is folded, and it depends on different situations.

Furthermore, an angle of the second seat 70 relative to the stroller frame 1 is adjustable after the second seat 70 is assembled on the stroller frame 1. Structure and operational principle illustrating an assembling process and an adjusting a process of the second seat 70 are described as follows.

Figure 6:
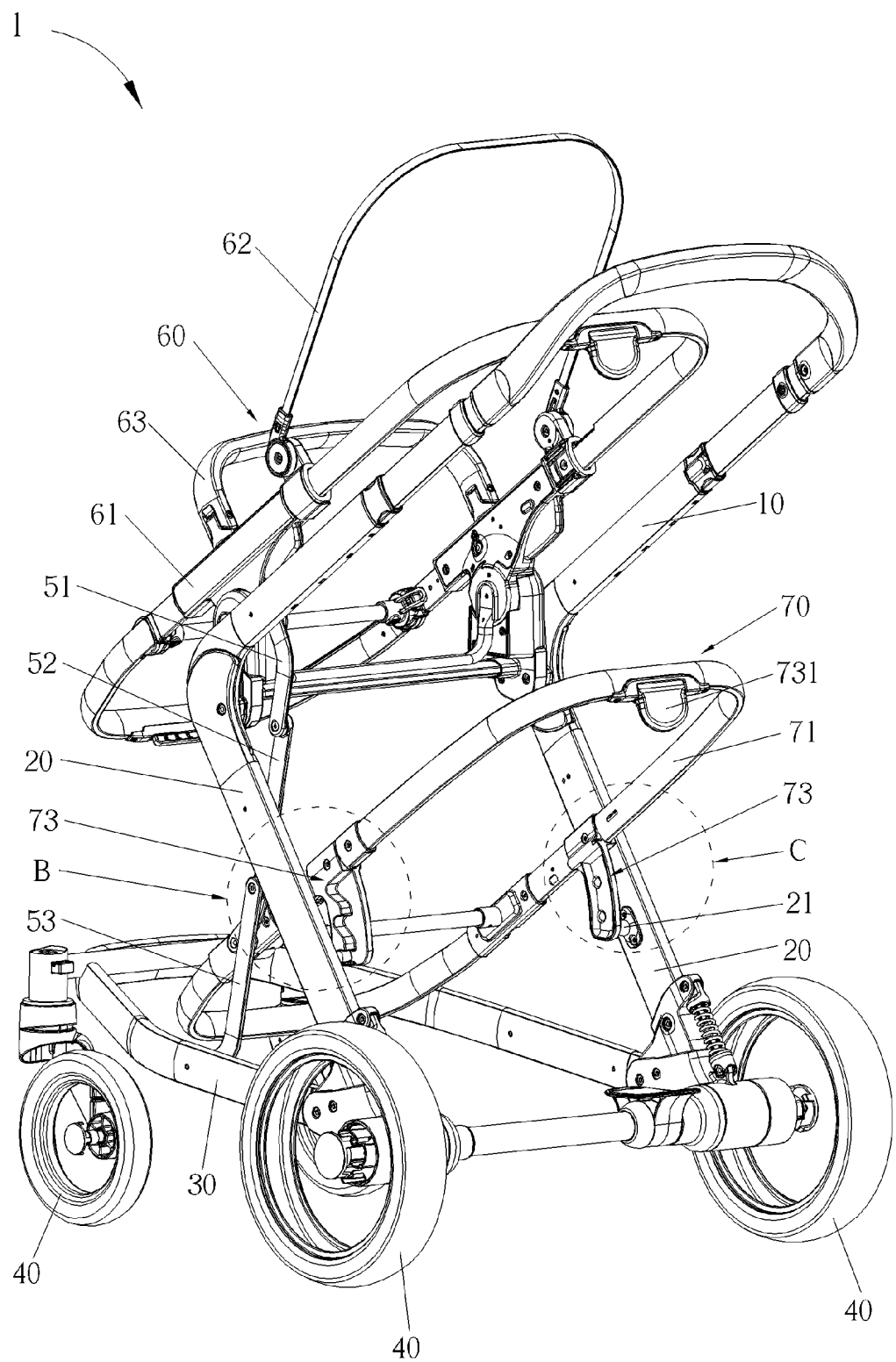
FIG. 6 is a schematic diagram of the stroller frame shown in FIG. 1 at another view according to the first embodiment of the present invention.

Please refer to FIG. 6. FIG. 6 is a schematic diagram of the stroller frame 1 shown in FIG. 1 at another view according to the first embodiment of the present invention. As shown in FIG. 3 to FIG. 6, the second seat 70 includes a supporting frame 71 substantially formed in a rectangular shape. A front end of the supporting frame 71 is pivoted to the second linking pipe 52 at the sixth pivoting point R6 in an engageable manner. A rear end of the supporting frame 71 adjustably engages with the two rear feet 20. When the stroller frame 1 is at the unfolding position, the supporting frame 71 intersects with the two rear feet 20 and the linking component 50, as shown in FIG. 3. When the stroller frame 1 is at the folding position, the two handles 10, the two rear feet 20, the bottom pipe 30, and the supporting frame 71 are substantially parallel to one another, as shown in FIG. 5.

Figure 7:
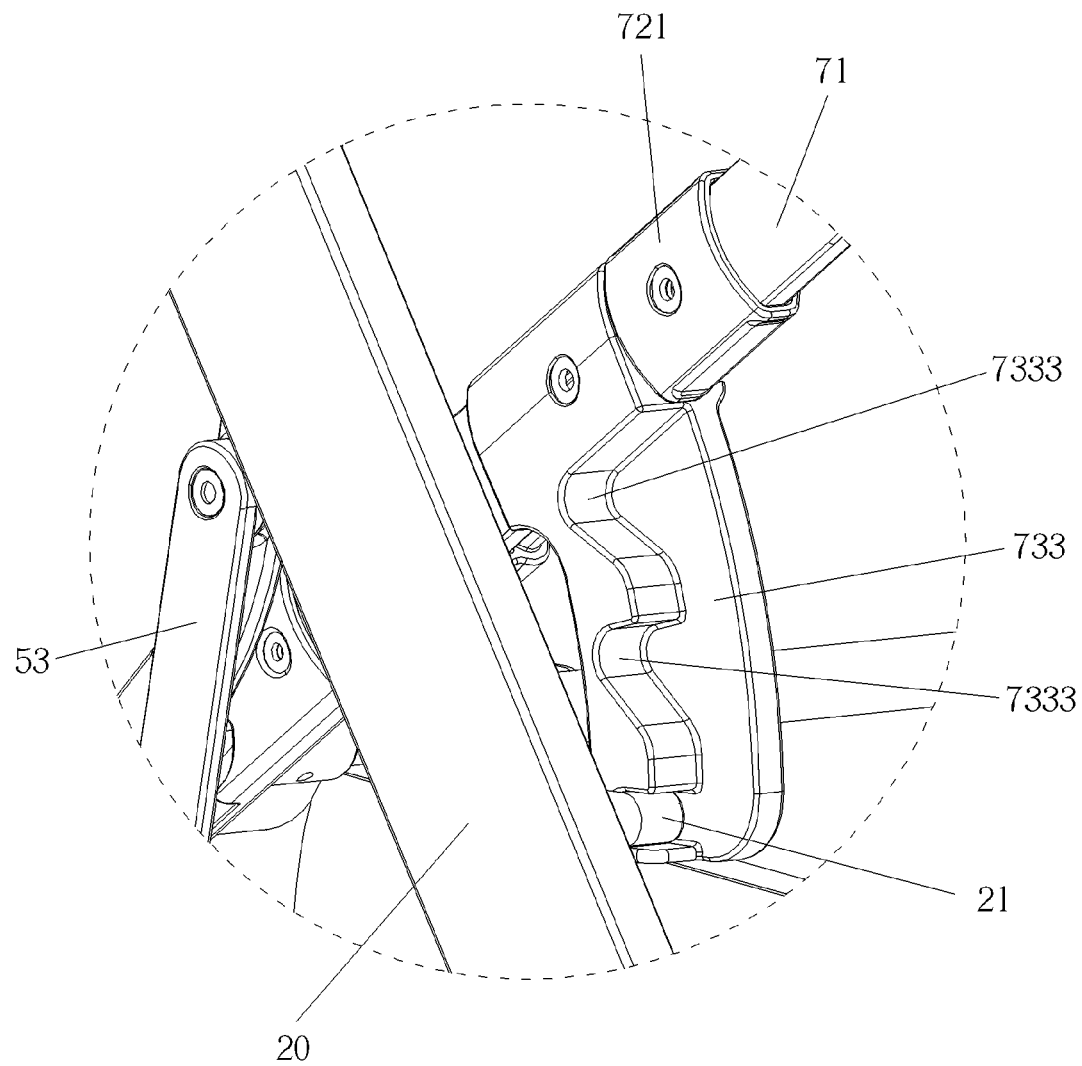
FIG. 7 is an enlarged diagram of a B portion of the stroller frame shown in FIG. 6 according to the first embodiment of the present invention.
Figure 8:
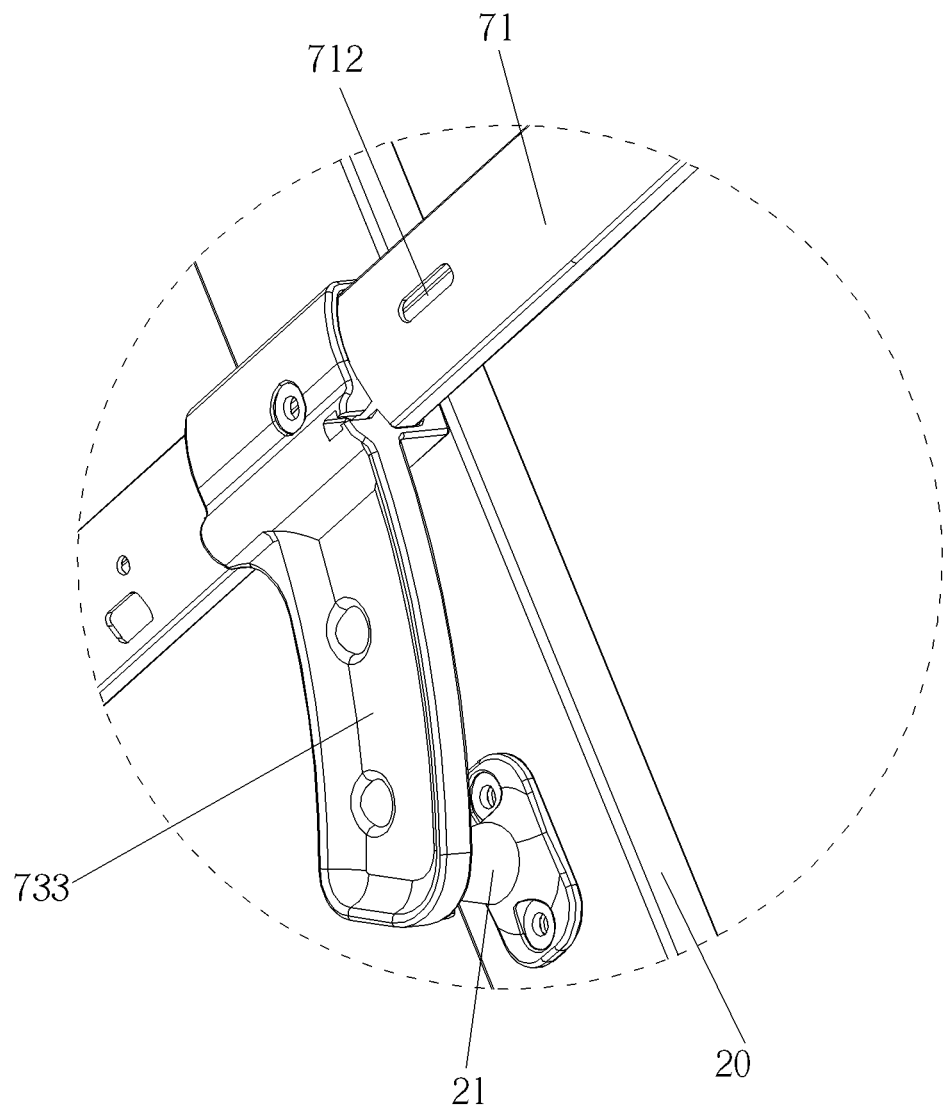
FIG. 8 is an enlarged diagram of a C portion of the stroller frame shown in FIG. 6 according to the first embodiment of the present invention.
Figure 9:
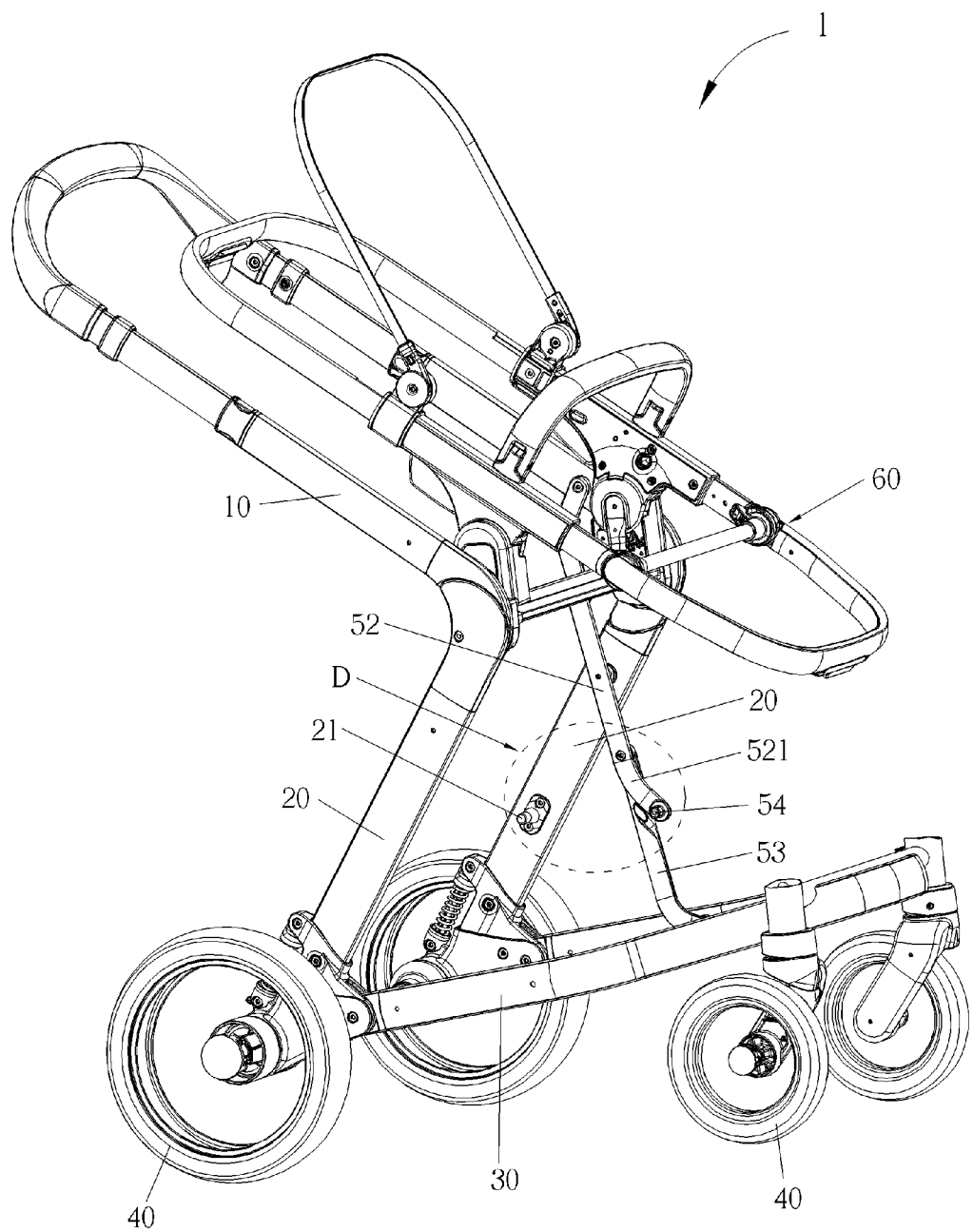
FIG. 9 is a schematic diagram of the stroller frame shown in FIG. 1 without illustrating a second seat according to the first embodiment of the present invention.
Figure 10:
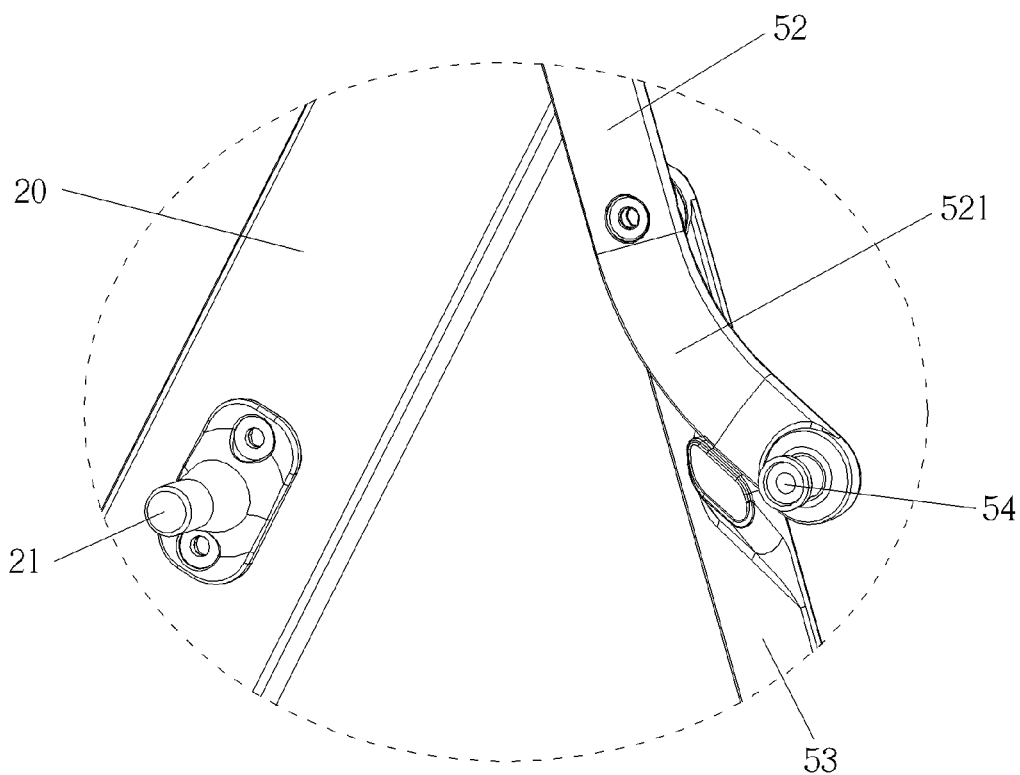
FIG. 10 is an enlarged diagram of a D portion of the stroller frame shown in FIG. 9 according to the first embodiment of the present invention.
Figure 11:
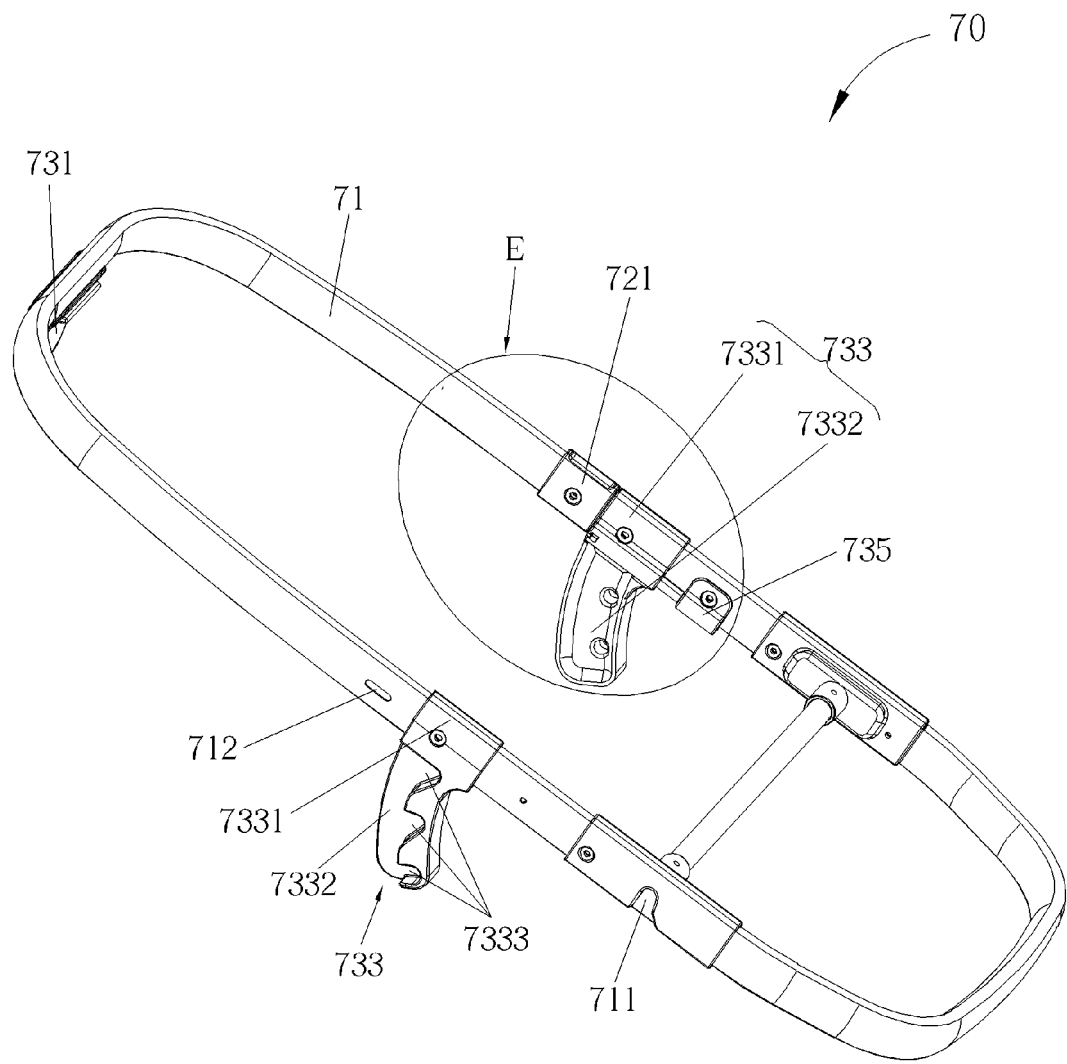
FIG. 11 is a diagram of the second seat shown in FIG. 1 according to the first embodiment of the present invention.
Figure 14:
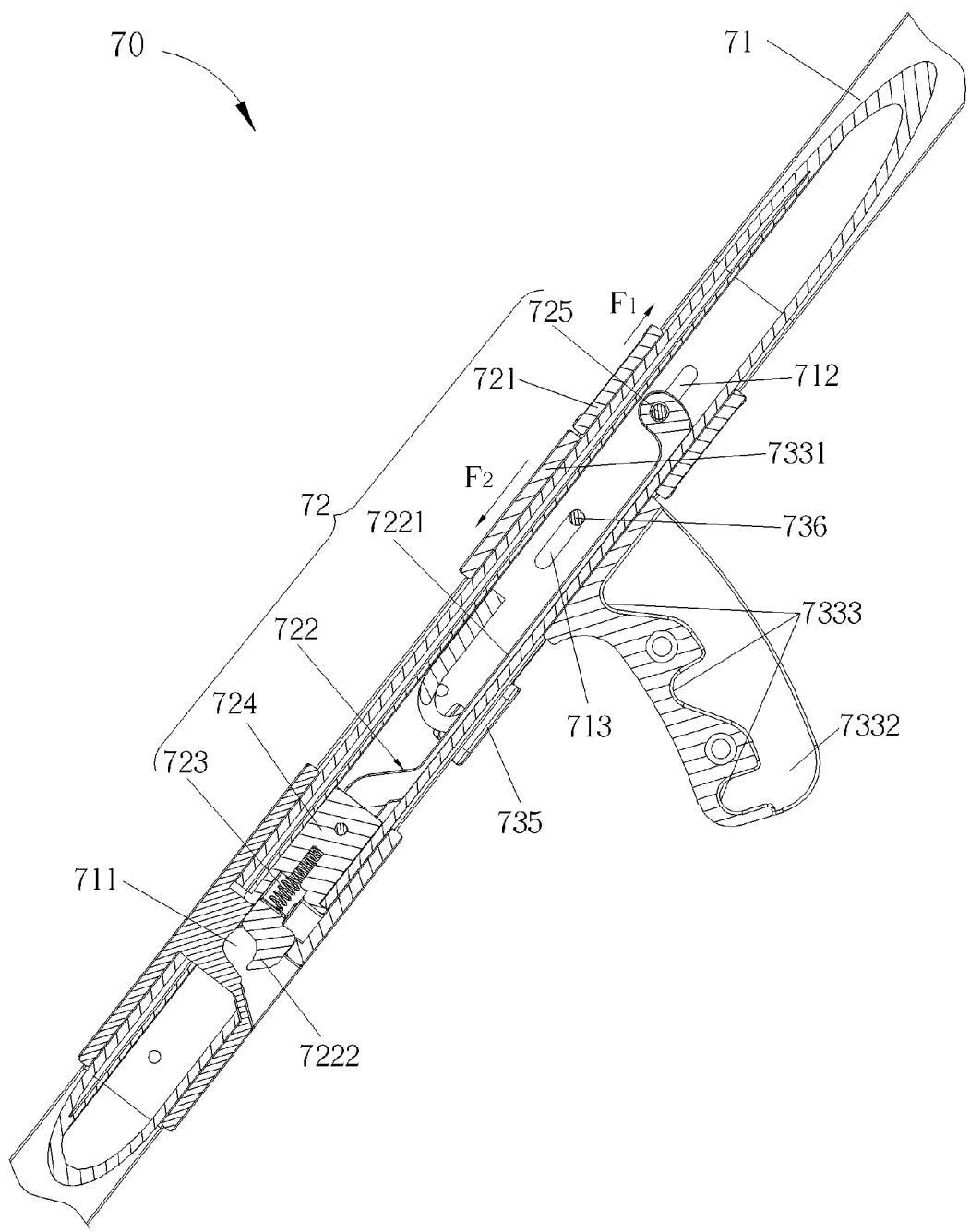
FIG. 14 is a partial sectional diagram of the second seat shown in FIG. 13 according to the first embodiment of the present invention.

Please refer to FIG. 7 to FIG. 11. FIG. 7 is an enlarged diagram of a B portion of the stroller frame 1 shown in FIG. 6 according to the first embodiment of the present invention. FIG. 8 is an enlarged diagram of a C portion of the stroller frame 1 shown in FIG. 6 according to the first embodiment of the present invention. FIG. 9 is a schematic diagram of the stroller frame 1 shown in FIG. 1 without illustrating the second seat 70 according to the first embodiment of the present invention. FIG. 10 is an enlarged diagram of a D portion of the stroller frame 1 shown in FIG. 9 according to the first embodiment of the present invention. FIG. 11 is a diagram of the second seat 70 shown in FIG. 1 according to the first embodiment of the present invention. The stroller frame 1 further includes a connecting column 54 protruding from the linking component 50. In this embodiment, the connecting column 54 is fixed on the bending portion 521 on the lower end of the second linking pipe 52. A connecting slot 711 is formed on a long side of the supporting frame 71 and located at a position corresponding to the connecting column 54. The connecting column 54 is pivoted to the connecting slot 711 in an engageable manner. Specifically, the stroller frame 1 further includes an engaging assembly 72 disposed on the second seat 70 and corresponding to the connecting slot 711, as shown in FIG. 14. The engaging assembly 72 detachably engages with the connecting column 54.

Additionally, the stroller frame 1 further includes an angle adjusting assembly 73 and two positioning pins 21. The two positioning pins 21 protrude from the two rear feet 20, as shown in FIG. 9 and FIG. 10. The angle adjusting assembly 73 is disposed on the supporting frame 71 and corresponding to the two positioning pins 21. The angle adjusting assembly 73 adjustably engages with the two positioning pins 21 for adjusting an angle of the second seat 70, as shown in FIG. 6 and FIG. 10.

As shown in FIG. 11 to FIG. 14, the engaging assembly 72 includes an operating component 721, an engaging component 722, a resilient component 723, and a fixing component 724. The operating component 721 is slidably sleeved on the supporting frame 71. The fixing component 724 is fixed inside the supporting frame 71. The engaging component 722 slidably passes through the fixing component 724 and is received in the supporting frame 71. An end of the engaging component 722 is fixed to the operating component 721. The other end of the engaging component 722 slidably protrudes into the connecting slot 711. The resilient component 723 abuts between the engaging component 722 and the fixing component 724 for recovering the engaging component 722 resiliently.

Figure 13:
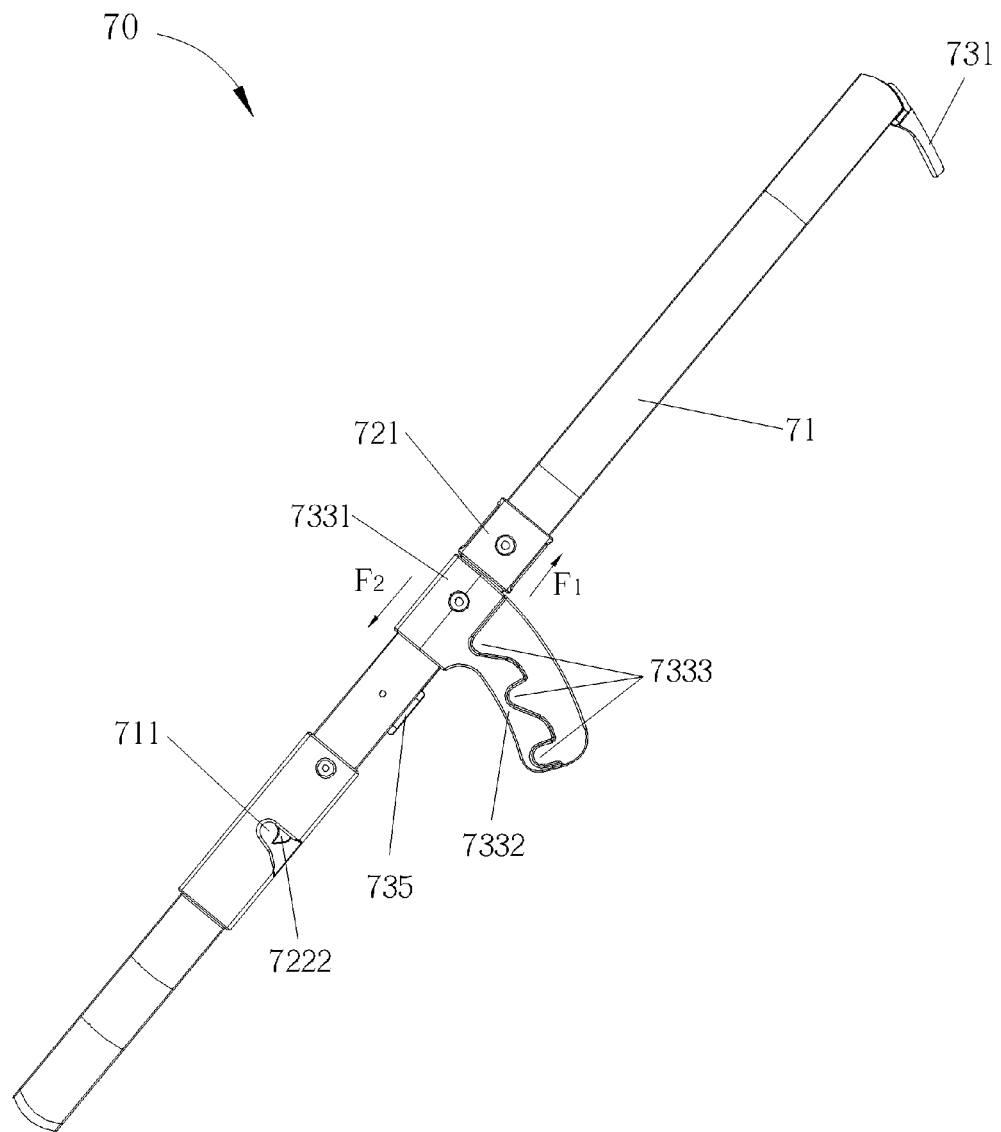
FIG. 13 is a lateral diagram of the second seat shown in FIG. 11 according to the first embodiment of the present invention.

As shown in FIG. 13 and FIG. 14, the engaging component 722 includes a connecting body 7221 and an engaging hook 7222 disposed on an end of the connecting body 7221. The connecting body 7221 is slidably received in the supporting frame 71. The engaging hook 7222 passes through the fixing component 724 to protrude into the connecting slot 711 for detachably engaging with the connecting column 54. A first pin 725 is fixed on an end of the connecting body 7221 away from the engaging hook 7222. The first pin 725 is slidably connected to the supporting frame 71 and fixed to the operating component 721. The resilient component 723 abuts between the engaging hook 7222 and the fixing component 724. When the engaging component 722 slides along an arrow direction F1 shown in FIG. 14, the resilient component 723 is forced to be compressed. When the engaging component 722 is released, the resilient component 723 restores and resiliently recovers the engaging component 722.

As shown in FIG. 14, a first sliding slot 712 is formed on the supporting frame 71 and located at a position corresponding to the operating component 721. The first pin 725 slidably passes through the first sliding slot 712 and fixed to the operating component 721. When it is desired to detach the second seat 70 from the stroller frame 1, the operating component 721 needs to be pulled along the arrow direction F1 shown in FIG. 13 and FIG. 14. The operating component 721 slides along the supporting frame 71 for driving the engaging component 722 to slide, such that the engaging hook 7222 is driven to retract into the supporting frame 71 for disengaging from the connecting column 54. At this moment, the angle adjusting assembly 73 can disengage from the two positioning pins 21 by pulling the second seat 70 forwardly for detaching the second seat 70.

When it is desired to assemble the second seat 70 on the stroller frame 1, the angle adjusting assembly 73 needs to align with the two positioning pins 21, and then the connecting slot 711 needs to align with the connecting column 54. At this moment, the supporting frame 71 can be directly pressed downwardly for engaging the connecting column 54 with the connecting slot 711. In such a way, the second seat 70 can rotate around the connecting column 54 for adjusting an angle of the second seat 70.

Structure and operational principle of the angle adjusting assembly 73 of the second seat 70 is described as follows. As shown in FIG. 11 to FIG. 14, the angle adjusting assembly 73 includes an operating grip 731, two first pulling components 732, two positioning components 733, and two first recovering components 734. The operating grip 731 is disposed on a short side of a rear end of the supporting frame 71. In this embodiment, the two first pulling components 732, two positioning components 733, and two first recovering components 734 are disposed on two long sides of the supporting frame 71 symmetrically. The two positioning components 733 are slidably sleeved on the two long sides of the supporting frame 71 and located under the two operating components 721. The two first pulling components 732 are received in the supporting frame 71. Two ends of each of the two first pulling components 732 are fixed on the operating grip 731 and the corresponding positioning component 733. The two first recovering components 734 are received in the supporting frame 71 and disposed between the two positioning components 733 and the second seat 70 for recovering the two positioning components 733. When the operating grip 731 is operated, the two positioning components 733 are pulled by the two first pulling components 732 to slide along an arrow direction F2 shown in FIG. 12 to FIG. 14 for disengaging from the two positioning pins 21. When the operating grip 731 is released, the two first recovering components 734 recover the two positioning components 733.

The angle adjusting assembly 73 further includes two blocking components 735 disposed on the supporting frame 71 and fixed on locations under the two operating components 721 by two fixing elements 737. The two positioning components 733 are slidable between the two operating components 721 and the two blocking components 735.

As shown in FIG. 14, each of the two positioning components 733 includes a sliding connecting portion 7331 and an engaging portion 7332 protruding from the sliding connecting portion 7331. The angle adjusting assembly 73 further includes a plurality of engaging sections 7333 disposed on a side of each of the two engaging portions 7332 corresponding to the two positioning pins 21. Each of the two positioning pins 21 detachably engages with one of the plurality of engaging sections 7333. Furthermore, two second sliding slots 713 are formed on the supporting frame 71. Two second pins 736 slidably pass through the two second sliding slots 713 and fixed to the two sliding connecting portions 7331.

Figure 12:
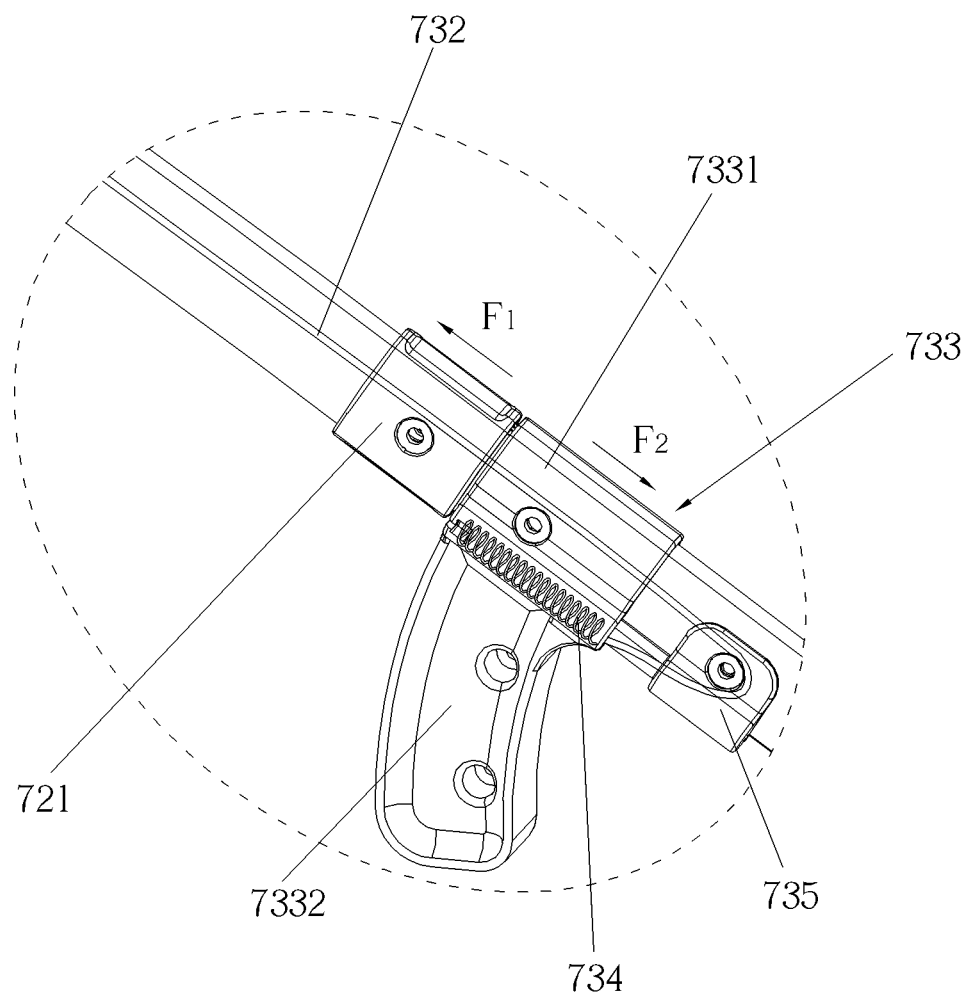
FIG. 12 is an enlarged diagram of an E portion of the stroller frame shown in FIG. 11 according to the first embodiment of the present invention.

As shown in FIG. 11 and FIG. 12, ends of the two first pulling components 732 are fixed on the operating grip 731. The other ends of the two first pulling components 732 wrap around the two fixing elements 737 fixing the two blocking components 735 and are fixed to the two sliding connecting portions 7331. Ends of the two first recovering components 734 abut against the two sliding connecting portions 7331. The other ends of the two first recovering components 734 abut against an inner wall of the supporting frame 71.

As shown in FIG. 11 to FIG. 14, when it is desired to adjust an angle of the second seat 70, the operating grip 731 can be operated for pulling the two positioning components 733 by the two first pulling components 732, such that the two positioning components 733 are driven to slide along the arrow direction F2, shown in FIG. 12 to FIG. 14. Therefore, the two positioning pins 21 disengage from the two corresponding engaging sections 7333 of the engaging portion 7332. At this moment, the supporting frame 71 can be pushed to rotate around the connecting column 54. During a sliding process of the two positioning components 733, the two first recovering components 734 are forced to be compressed. When the operating grip 731 is released, the two first recovering components 734 restore and recover the two positioning components 733, such that the two positioning pins 21 engage with another two engaging sections 7333 so as to achieve adjustment of an angle of the second seat 70.

Figure 15:
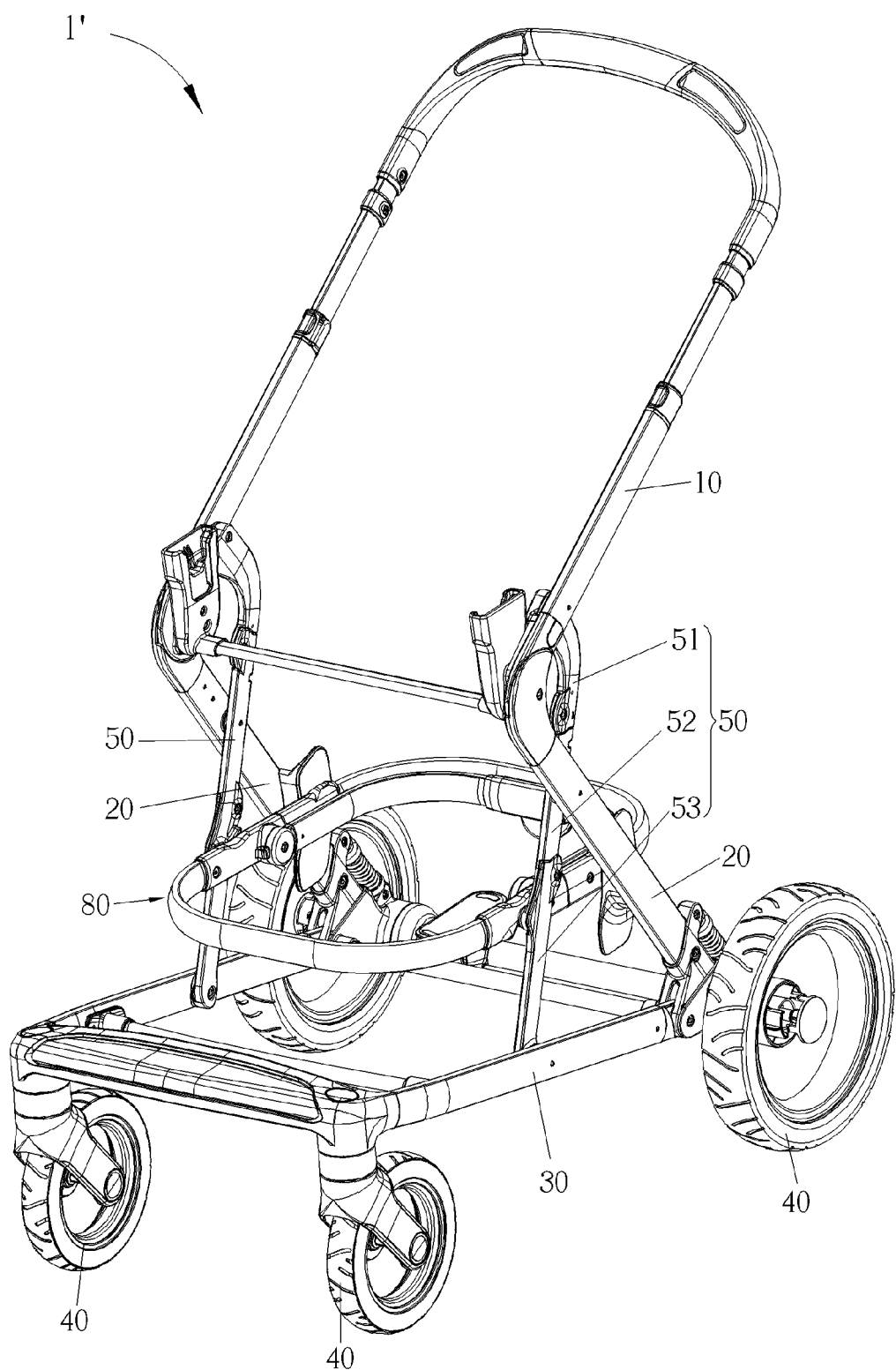
FIG. 15 is a schematic diagram of a stroller frame according to a second embodiment of the present invention.
Figure 16:
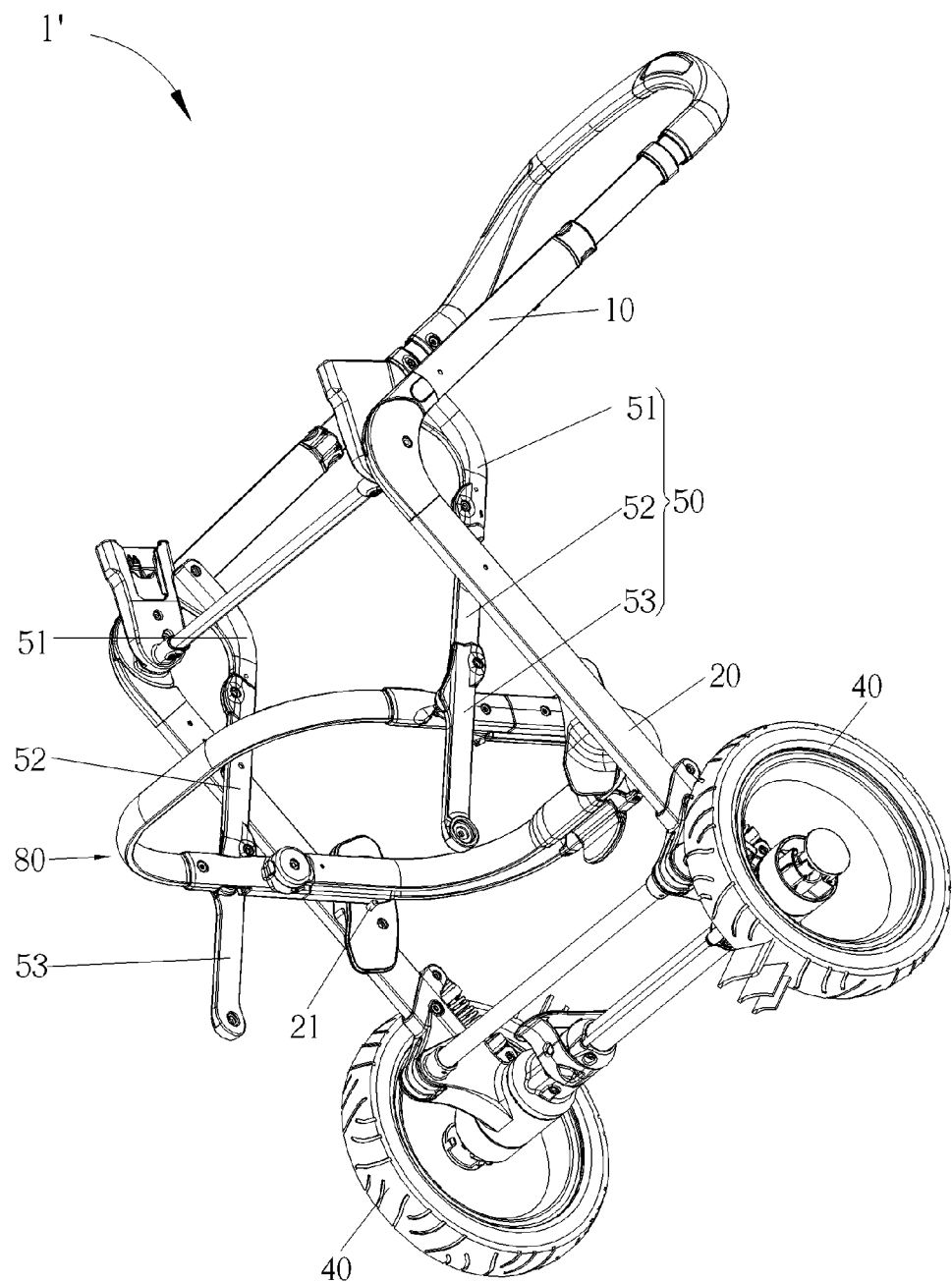
FIG. 16 is a schematic diagram of the stroller frame shown in FIG. 15 at another view without illustrating a bottom pipe according to the second embodiment of the present invention.
Figure 17:
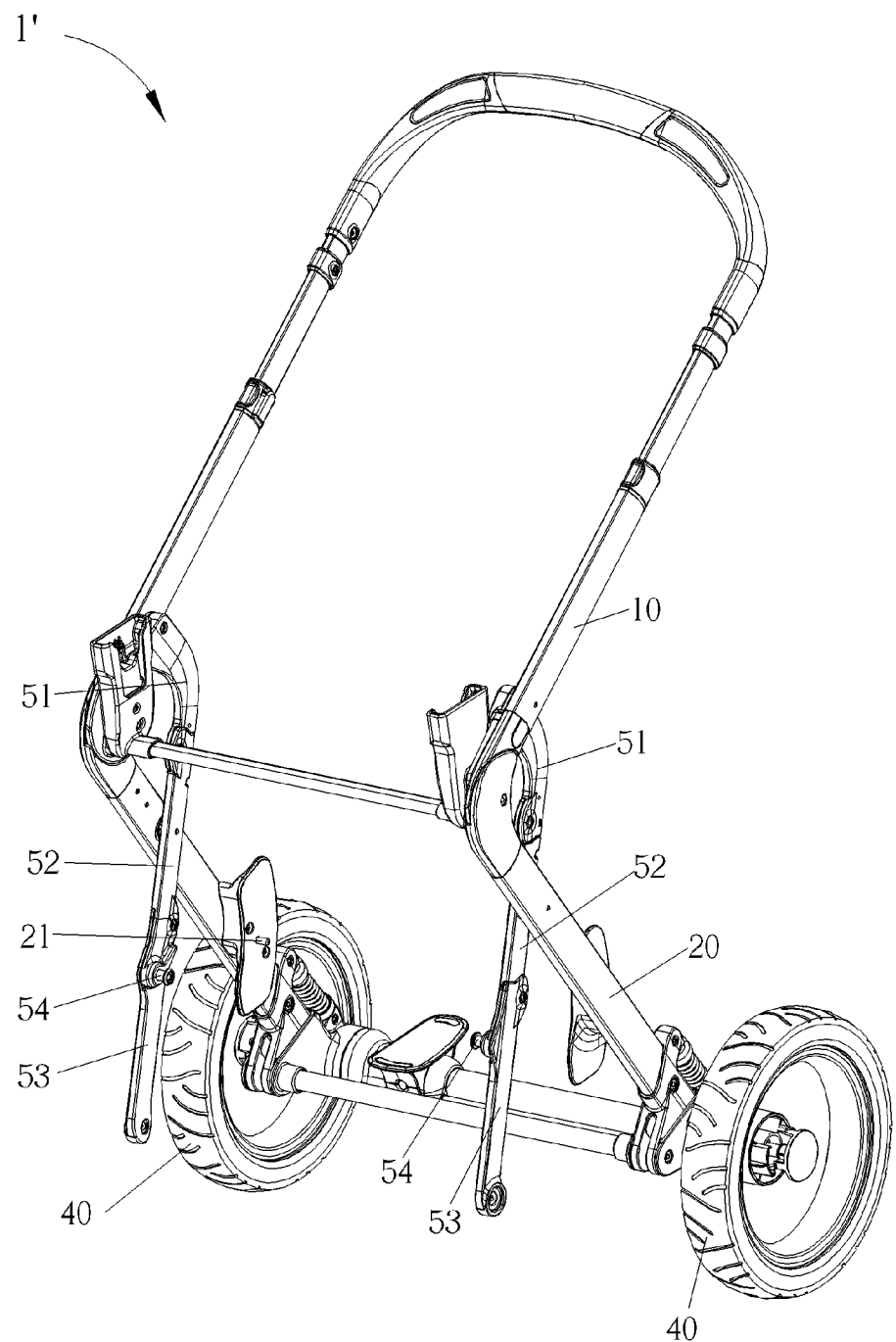
FIG. 17 is a schematic diagram of the stroller frame shown in FIG. 16 without illustrating a basket according to the second embodiment of the present invention.
Figure 18:
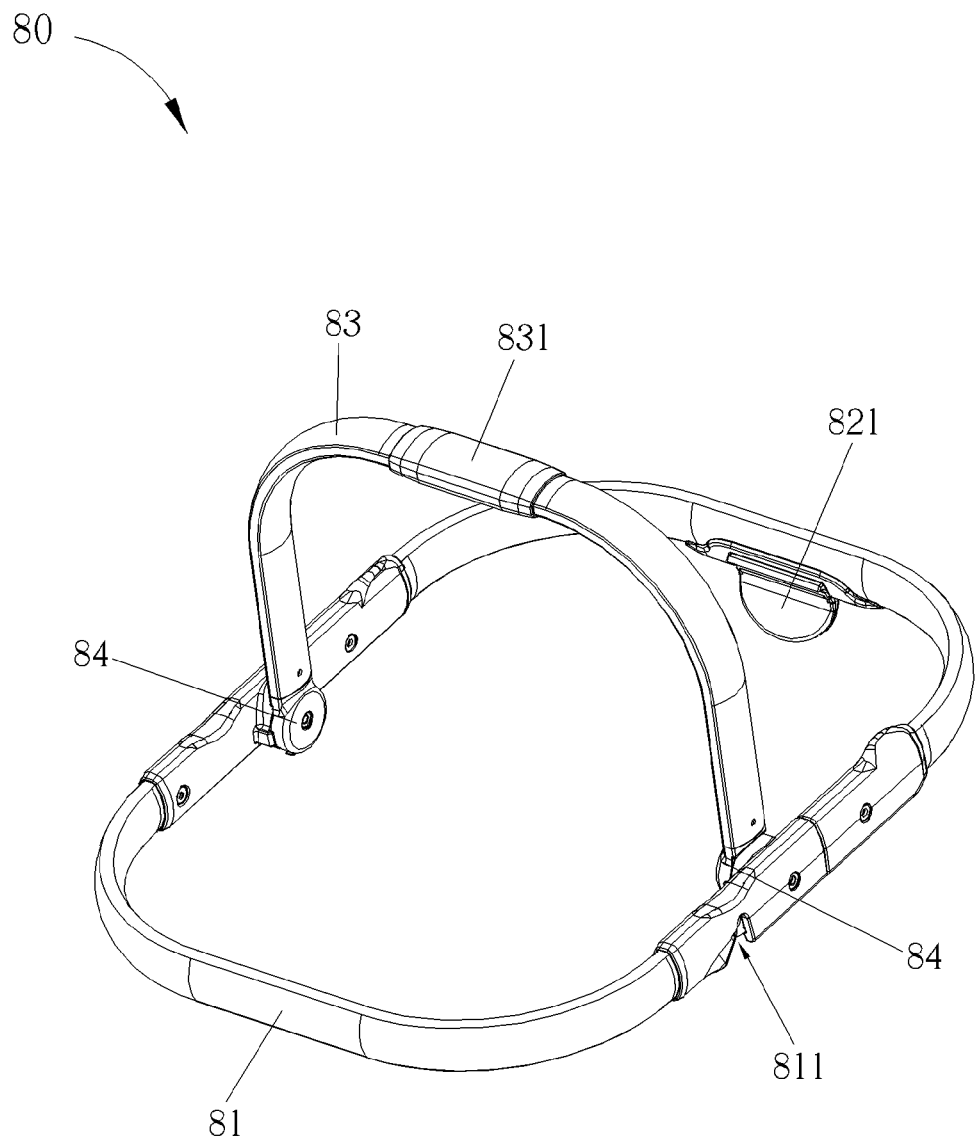
FIG. 18 is a diagram of the basket shown in FIG. 15 according to the second embodiment of the present invention.
Figure 19:
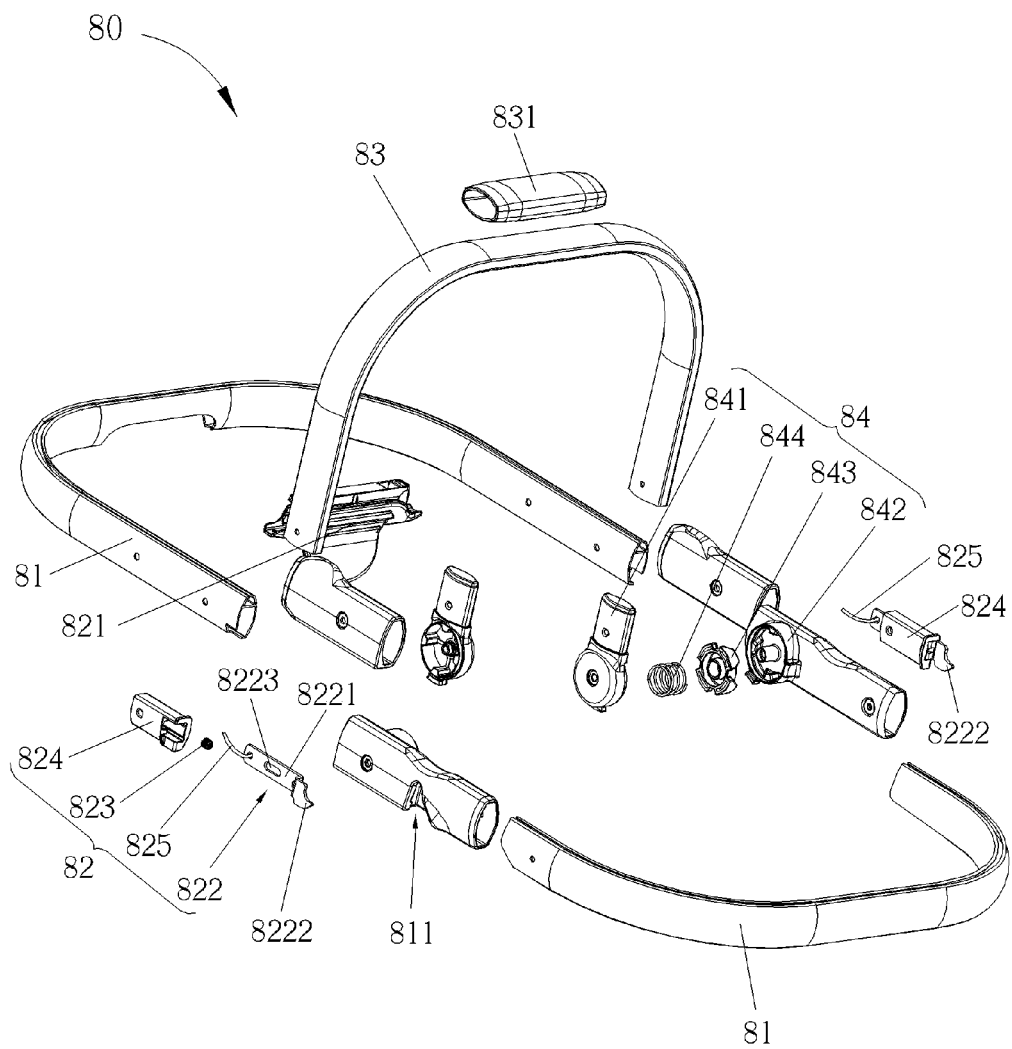
FIG. 19 is an exploded diagram of the basket shown in FIG. 18 according to the second embodiment of the present invention.
Figure 20:
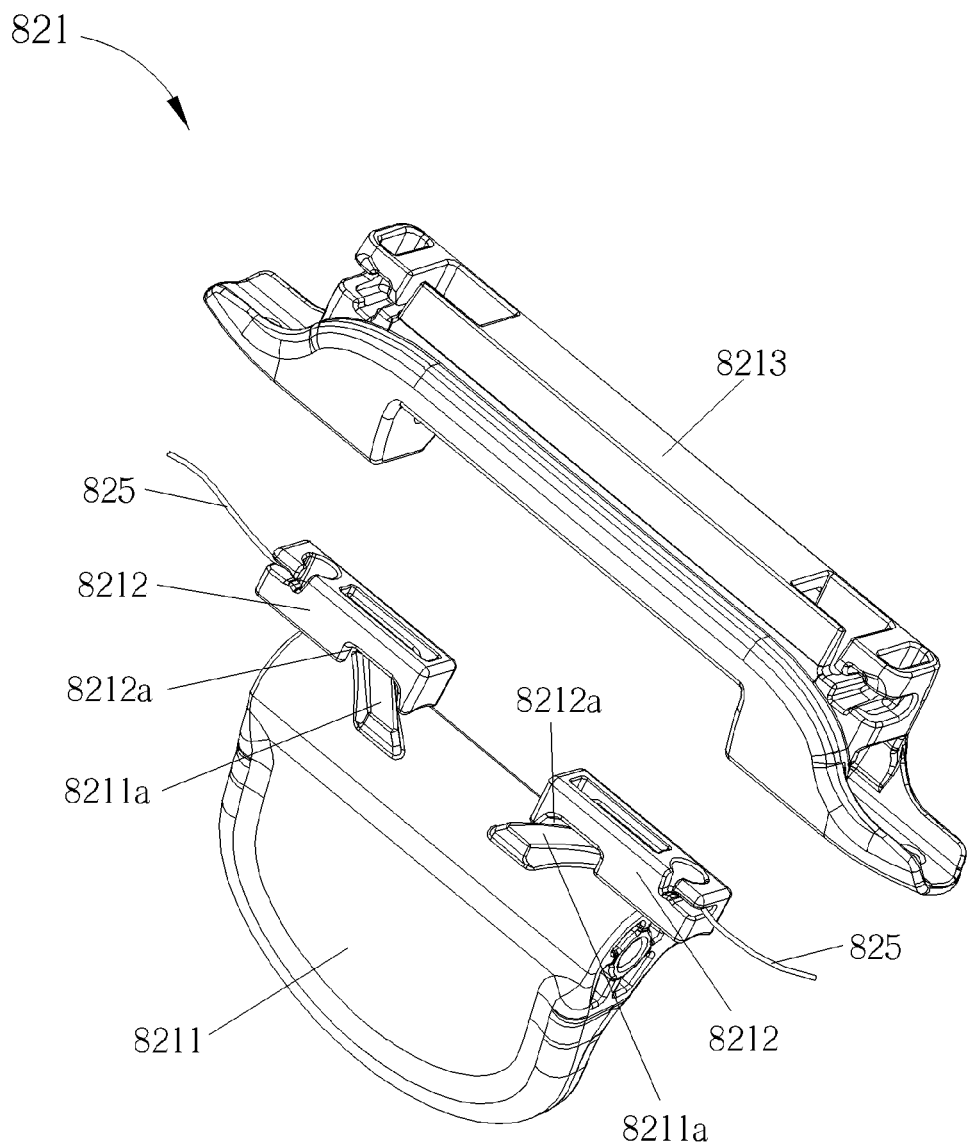
FIG. 20 is an exploded diagram of an operating component shown in FIG. 19 according to the second embodiment of the present invention.
Figure 21:
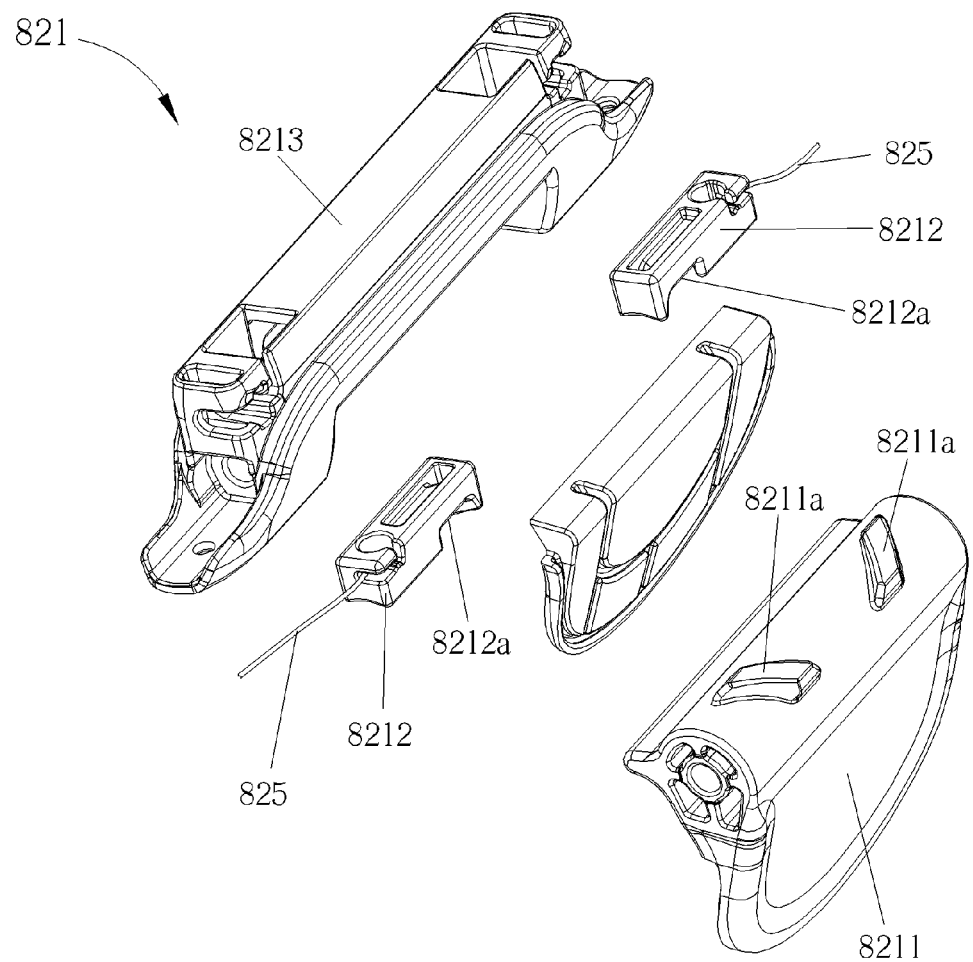
FIG. 21 is another exploded diagram of the operating component shown in FIG. 19 according to the second embodiment of the present invention.

Please refer to FIG. 15 to FIG. 21. FIG. 15 is a schematic diagram of a stroller frame 1' according to the second embodiment of the present invention. FIG. 16 is a schematic diagram of the stroller frame 1' shown in FIG. 15 at another view without illustrating the bottom pipe 30 according to the second embodiment of the present invention. FIG. 17 is a schematic diagram of the stroller frame 1' shown in FIG. 16 without illustrating a basket 80 according to the second embodiment of the present invention. FIG. 18 is a diagram of the basket 80 shown in FIG. 15 according to the second embodiment of the present invention. FIG. 19 is an exploded diagram of the basket 80 shown in FIG. 18 according to the second embodiment of the present invention. FIG. 20 is an exploded diagram of an operating component 821 shown in FIG. 19 according to the second embodiment of the present invention. FIG. 21 is another exploded diagram of the operating component 821 shown in FIG. 19 according to the second embodiment of the present invention. In this embodiment, the stroller frame 1' includes two linking components 50 disposed symmetrically and two connecting columns 54 respectively protruding from the two linking components 50, and the carrier device is the basket 80 detachably disposed between the two rear feet 20. Other structures of the stroller frame 1' in the second embodiment are similar to the ones of the stroller frame 1 in the first embodiment. Detailed descriptions are omitted herein for simplicity.

As shown in FIG. 15 to FIG. 19, the basket 80 includes a supporting frame 81 and an engaging assembly 82. Two connecting slots 811 are formed on the supporting frame 81 and located at positions corresponding to the two connecting columns 54 of the two linking components 50. The engaging assembly 82 is disposed on the supporting frame 81 and corresponding to the two connecting slots 811. The engaging assembly 82 includes an operating component 821, two engaging components 822, two resilient components 823, two fixing components 824, and two second pulling components 825. In this embodiment, the two engaging components 822 are disposed on two long sides of the basket 80 and driven by one single operating component 821. Therefore, the operating component 821 of the engaging assembly 82 in the second embodiment is different from the operating component 721 of the engaging assembly 72 in the first embodiment. Structure and operational principle of the engaging component 822, the resilient component 823, the fixing component 824, and the second pulling component 825 in the second embodiment are similar to the engaging component 722, the resilient component 723, the fixing component 724, and the second pulling component 725 in the first embodiment.

Specifically, the operating component 821 is rotatably disposed on a side of the supporting frame 81. The two engaging components 822 slidably pass through the two fixing components 824. Ends of the two engaging components 822 are fixed to the operating component 821 by the two second pulling components 825. The other ends of the two engaging components 822 slidably protrude into the two connecting slots 811 for detachably engaging with the two connecting columns 54. The two resilient components 823 abut between the two engaging components 822 and the two fixing components 824 for recovering the two engaging components 822.

Each of the two engaging components 822 includes a connecting body 8221 and an engaging hook 8222 disposed on an end of the connecting body 8221. A third sliding slot 8223 is formed on the connecting body 8221. The two connecting bodies 8221 are slidably received in the two fixing components 824. Two third pins, which are not shown in figures, pass through the two third sliding slots 8223 and fixed on the two fixing components 824. The two engaging hooks 8222 protrude into the two connecting slots 811.

When it is desired to detach the basket 80, the operating component 821 can be operated to rotate to pull the two second pulling components 825 for driving the two engaging components 822 to slide, such that the two engaging hooks 8222 retract into the supporting frame 81 to disengage from the two connecting columns 54. Afterwards, the basket 80 can be lifted upwardly, which achieves detachment of the basket 80. When the two engaging components 822 slide, the two resilient components 823 are forced to be compressed. When the operating component 821 is released, the two resilient components 823 restore and recover the two engaging components 822.

When it is desired to assemble the basket 80 on the stroller frame 1', the two connecting slots 811 needs to align with the two connecting columns 54 and then to directly press the supporting frame 81 downwardly, such that the two connecting slots 811 engage with the two connecting columns 54. Afterwards, a rear end of the supporting frame 81 can be supported on the two positioning pins 21, as shown in FIG. 15 and FIG. 16.

Structure and operation of the operating component 821 are described as follows. As shown in FIG. 20, the operating component 821 includes a releasing grip 8211, two driving blocks 8212, and a fixing block 8213. The fixing block 8213 is fixed on the supporting frame 81. The two driving blocks 8212 are slidably received in the fixing block 8213. The releasing grip 8211 is rotatably connected to the fixing block 8213 and cooperatively connected to the two driving blocks 8212. The two driving blocks 8212 are fixed on ends of the two second pulling components 825 respectively. When the releasing grip 8211 rotates, the two driving blocks 8212 are driven to slide, such that the two engaging components 822 are pulled by the two second pulling components 825 to slide for disengaging from the two connecting columns 54.

As shown in FIG. 20 and FIG. 21, the releasing grip 8211 includes two protruding ribs 8211a formed obliquely. The two protruding ribs 8211a are cooperatively connected to the two driving blocks 8212 respectively. A recess 8212a is formed on each of the two driving blocks 8212. Each of the two recesses 8212a is perpendicular to a sliding direction of the corresponding driving block 8212. An extending direction of each of the two recesses 8212a intersects with an extending direction of the corresponding protruding rib 8211a by a predetermined angle. Each of the two recesses 8212a engages with the corresponding protruding rib 8211a. Therefore, when the releasing grip 8211 rotates, the two protruding ribs 8211a provide acting forces for the two recesses 8212a to drive the two driving blocks 8212 to slide.

Figure 22:
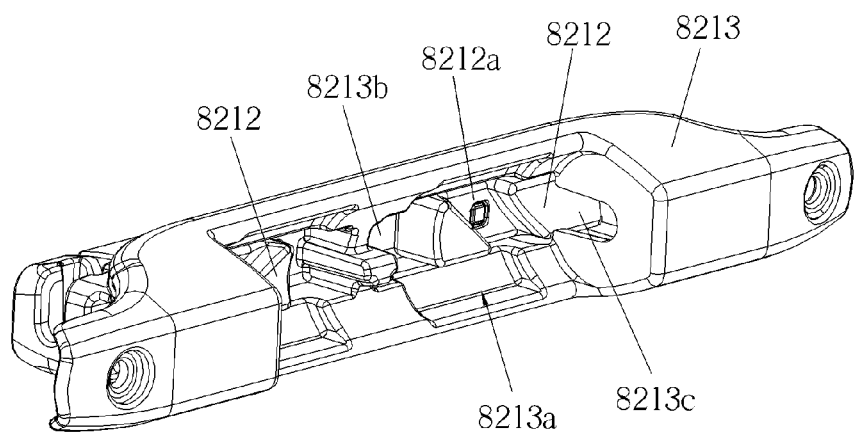
FIG. 22 is a diagram of a fixing block shown in FIG. 21 at another view according to the second embodiment of the present invention.

Please refer to FIG. 22. FIG. 22 is a diagram of the fixing block 8213 shown in FIG. 21 at another view according to the second embodiment of the present invention. As shown in FIG. 22, a receiving slot 8213a is formed on the fixing block 8213. Two sliding slots 8213b are formed on a bottom wall of the receiving slot 8213a. Two connecting holes 8213c are formed on two side walls of the receiving slot 8213a. The two driving blocks 8212 are slidably disposed inside the two sliding slots 8213b respectively. An end of the releasing grip 8211 with the two protruding ribs 8211a is received in the receiving slot 8213a. The two protruding ribs 8211a engage with the two recesses 8212a respectively. The releasing grip 8211 is rotatably connected to the two connecting holes 8213c respectively. When the releasing grip 8211 is operated to rotate, the two driving blocks 8212 are driven to move toward each other, such that the two engaging components 822 are pulled to be released by the two second pulling components 825. When the releasing grip 8211 is released, the aforementioned components can return to their original positions by the two resilient components 823.

Figure 23:
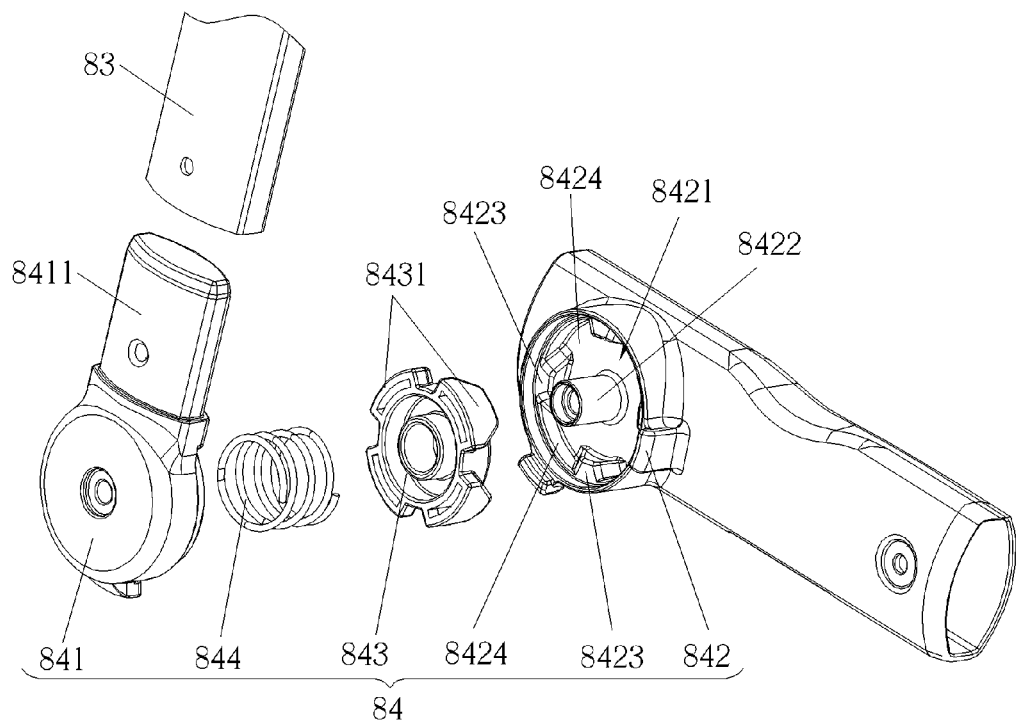
FIG. 23 is an enlarged diagram of a section adjusting assembly shown in FIG. 19 according to the second embodiment of the present invention.
Figure 24:
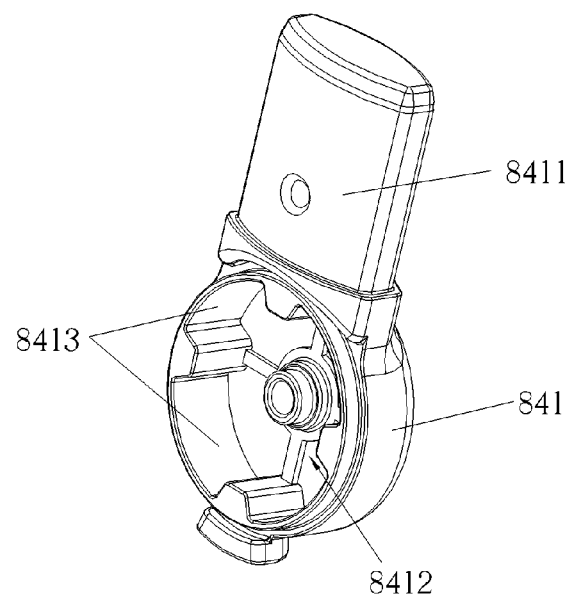
FIG. 24 is a diagram of a first pivoting joint shown in FIG. 23 at another view according to the second embodiment of the present invention.

Please refer to FIG. 23 and FIG. 24. FIG. 23 is an enlarged diagram of a section adjusting assembly 84 shown in FIG. 19 according to the second embodiment of the present invention. FIG. 24 is a diagram of a first pivoting joint 841 shown in FIG. 23 at another view according to the second embodiment of the present invention. As shown in FIG. 18, FIG. 19, FIG. 23 and FIG. 23, the basket 80 further includes a gripping handle 83 and two section adjusting assemblies 84. The gripping handle 83 is connected to the supporting frame 81 via the two section adjusting assemblies 84. A carrying grip 831 is sleeved on the gripping handle 83 and can be made of Thermoplastic Elastomer (TPE) material.

Each of the section adjusting assemblies 84 includes the first pivoting joint 841, a second pivoting joint 842, a moving component 843, and a second recovering component 844. A fixing portion 8411 protrudes from the first pivoting joint 841. The gripping handle 83 is fixedly sleeved on the fixing portion 8411. A first accommodating chamber 8412 is formed on the first pivoting joint 841. A plurality of positioning slots 8413 is spaced on an inner wall of the first accommodating chamber 8412 at intervals. The moving component 843 is slidably received in the first accommodating chamber 8412 and positioned by the plurality of positioning slots 8413.

Correspondingly, the second pivoting joint 842 is connected to the supporting frame 81. A second accommodating chamber 8421 is formed on the second pivoting joint 842 and corresponding to the first accommodating chamber 8412. Each of the two section adjusting assemblies 84 further includes a pivoting shaft 8422 and a plurality of protruding teeth 8423. The pivoting shaft 8422 protrudes from a center of the second accommodating chamber 8421. The plurality of protruding teeth 8423 protrudes from an inner wall of the second accommodating slot 8421 and spaced at intervals. An engaging slot 8424 is formed between two adjacent protruding teeth 8423. An inclined surface is formed on each of the plurality of protruding teeth 8423 for driving the moving component 843.

Each of the section adjusting assemblies 84 further includes a plurality of engaging protrusions 8431 protruding from an inner wall of the moving component 843 and spaced at intervals. The plurality of engaging protrusions 8431 is corresponding to the plurality of positioning slots 8413 and the plurality of engaging slots 8424. The moving component 843 is slidably sleeved on the pivoting shaft 8422 and received in the first accommodating chamber 8412 and the second accommodating chamber 8421. The plurality of engaging protrusions 8431 slidably engages with the plurality of positioning slots 8413. The second recovering component 844 is received in the first accommodating chamber 8412 and abuts between the moving component 843 and the first pivoting joint 841.

As shown in FIG. 18, FIG. 19, FIG. 23 and FIG. 24, when the gripping handle 83 is operated to rotate, the two first pivoting joints 841 rotate to drive the two moving components 843 to rotate along with the gripping handle 83. At this moment, the inclined surfaces of the plurality of protruding teeth 8423 push the plurality of engaging protrusions 8431 to drive the two moving components 843 to slide along the two pivoting shafts 8422, such that the plurality of engaging protrusions 8431 disengages from the plurality of engaging slots 8424 completely. Therefore, the gripping handle 83 can be pushed to rotate continuously. After the gripping handle 83 rotates by a predetermined angle, the plurality of engaging protrusions 8431 is located corresponding to the plurality of engaging slots 8424 at another position. At the moment, the two second recovering components 844 recover to drive the two moving components 843 to slide, such that the plurality of engaging protrusions 8431 of the two moving components 843 engages with the plurality of engaging slots 8424 at another position, which can position the gripping handle 83 at another position.

In contrast to the prior art, the stroller frame of the present invention includes a bottom pipe, a rear foot, a handle, a carrier device, and a linking component. The rear foot is pivoted to the bottom pipe. The handle is pivoted to the rear foot. A rear end of the carrier device is detachably connected to the rearfoot. The linking component is pivotally bendable. Two opposite ends of the linking component are pivoted to the handle and the bottom pipe respectively. A middle portion of the linking component is pivoted to the rear foot. A front end of the carrier device is pivoted to the linking component in an engageable manner. In such a way, the stroller frame utilizes the linking component to drive the carrier device to be folded when the stroller frame is folded. Therefore, the stroller frame of the present invention can be folded into a smaller size easily, which is convenience for storage and transportation. Furthermore, depending on different situations, the carrier device can be detached from the stroller frame.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller frame comprising:
   a bottom pipe;
   a rear foot pivoted to the bottom pipe;
   a handle pivoted to the rear foot;
   a carrier device, a rear end of the carrier device being detachably connected to the rear foot; and
   a linking component being pivotally bendable, two opposite ends of the linking component being pivoted to the handle and the bottom pipe respectively, a middle portion of the linking component being pivoted to the rear foot, a front end of the carrier device being pivoted to the linking component in an engageable manner, and the linking component driving the carrier device to be folded when the stroller frame is folded.

2. The stroller frame of claim 1, wherein the linking component expands between the bottom pipe and the handle when the stroller frame is unfolded, the linking component is pivotally bent to drive the carrier device to rotate during a period that the stroller frame rotates to be folded, and the bottom pipe, the rear foot, the handle, and the carrier device are substantially parallel to one another when the stroller frame is folded.

3. The stroller frame of claim 1, wherein an upper end of the rear foot is pivoted to a lower end of the handle at a first pivoting point, a lower end of the rear foot is pivoted to a rear end of the bottom pipe at a second pivoting point, the linking component is pivoted to the handle, the rear foot, and the bottom pipe at a third pivoting point, a fourth pivoting point, and a fifth pivoting point respectively, and the third pivoting point and the fourth pivoting point are located between the first pivoting point and the second pivoting point when the stroller completely folded.

4. The stroller frame of claim 3, wherein the linking component further comprises:
   a first linking pipe, an upper end of the first linking pipe being pivoted to the handle;
   a second linking pipe pivoted to the first linking pipe and the rear foot, and the second linking pipe further being pivoted to the carrier device in an engageable manner; and
   a third linking pipe pivoted to the second linking pipe, a lower end of the third linking pipe being pivoted to the bottom pipe.

5. The stroller frame of claim 4, wherein a lower end of the second linking pipe is formed in a curved shape and pivoted to the carrier device at a sixth pivoting point in an engageable manner, and when the stroller frame is unfolded, the linking component is formed in a straight line, and the sixth pivoting point is located in front of the linking component.

6. The stroller frame of claim 1, wherein the carrier device intersects with the rear foot and the linking component when the stroller frame is unfolded.

7. The stroller frame of claim 1, further comprising a connecting column protruding from the linking component, a connecting slot being formed on the carrier device and located at a position corresponding to the connecting column, and the connecting slot being pivoted to the connecting column in an engageable manner.

8. The stroller frame of claim 7, further comprising an engaging assembly disposed on the carrier device, the engaging assembly comprising an engaging component slidably protruding into the connecting slot for detachably engaging with the connecting column.

9. The stroller frame of claim 8, wherein the engaging assembly further comprises a resilient component disposed between the engaging component and the carrier device for recovering the engaging component resiliently.

10. The stroller frame of claim 8, wherein the engaging assembly further comprises an operating component connected to the carrier device and the engaging component for driving the engaging component to slide.

11. The stroller frame of claim 10, wherein the engaging component comprises a connecting body and an engaging hook disposed on an end of the connecting body, the connecting body is slidably received in the carrier device and connected to the operating component, and the engaging hook protrudes into the connecting slot for detachably engaging with the connecting column.

12. The stroller frame of claim 10, wherein the operating component is slidably sleeved on the carrier device.

13. The stroller frame of claim 10, wherein the operating component comprises a releasing grip and a driving block connected to each other cooperatively, the driving block is connected to the engaging component, and the releasing grip is rotatably connected to the carrier device for driving the driving block to slide.

14. The stroller frame of claim 13, wherein a recess is formed on the driving block and substantially perpendicular to a sliding direction of the driving block, the releasing grip comprises a protruding rib intersecting with the recess by a predetermined angle, and the recess engages with the protruding rib.

15. The stroller frame of claim 13, wherein the operating component further comprises a fixing block fixed on the carrier device, a receiving slot is formed on the fixing block, the releasing grip is rotatably received in the receiving slot, and the driving block is slidably disposed inside the fixing block.

16. The stroller frame of claim 1, further comprising:
a positioning pin protruding from the rear foot; and
an angle adjusting assembly disposed on the carrier device and located at a position corresponding to the positioning pin, the angle adjusting assembly and the positioning pin being adjustably connected to each other for adjusting an angle of the carrier device.

17. The stroller frame of claim 16, wherein the angle adjusting assembly further comprises:
a positioning component slidably connected to the carrier device; and
a plurality of engaging sections disposed on the positioning component, the positioning pin selectively and detachably engaging with one of the plurality of engaging sections.

18. The stroller frame of claim 17, wherein the angle adjusting assembly further comprises an operating grip connected to the positioning component for driving the positioning component to disengage from the positioning pin.

19. The stroller frame of claim 18, wherein the angle adjusting assembly further comprises a first pulling component received in the carrier device, and two ends of the first pulling component are fixed to the operating grip and the positioning component respectively.

20. The stroller frame of claim 18, wherein the angle adjusting assembly further comprises a first recovering component received in the carrier device and disposed between the positioning component and the carrier device for driving the positioning component to recover.

21. The stroller frame of claim 1, further comprising:
a positioning pin protruding from the rear foot and detachably supporting the rear end of the carrier device.

22. The stroller frame of claim 1, wherein the carrier device comprises:
a supporting frame;
a gripping handle pivotally connected to the supporting frame; and
a section adjusting assembly for positioning the gripping handle.

23. The stroller frame of claim 22, wherein the section adjusting assembly comprises:
a first pivoting joint fixed on the gripping handle;
a second pivoting joint disposed on the supporting frame; and
a moving component slidably disposed between the first pivoting joint and the second pivoting joint and detachably engaging with the second pivoting joint.

24. The stroller frame of claim 23, wherein the section adjusting assembly further comprises an engaging protrusion disposed on the moving component, a plurality of engaging slots is spaced on an inner wall of the second pivoting joint at intervals, and the engaging protrusion detachably engages with one of the plurality of engaging slots.

25. The stroller frame of claim 24, wherein the section adjusting assembly further comprises a plurality of protruding teeth spaced on the inner wall of the second pivoting joint at intervals, each of the plurality of engaging slots is formed between two corresponding adjacent protrusion teeth of the plurality of protruding teeth, and the plurality of protruding teeth is for pushing the engaging protrusion to disengage from the corresponding engaging slot.

26. The stroller frame of claim 24, wherein a plurality of positioning slots is formed on the first pivoting joint and corresponding to the engaging protrusion, and the engaging protrusion slidably engages with one of the plurality of positioning slots.

27. The stroller frame of claim 23, wherein the section adjusting assembly further comprises a pivoting shaft disposed in the second pivoting joint, and the moving component is slidably sleeved on the pivoting shaft.

28. The stroller frame of claim 23, wherein the section adjusting assembly further comprises a second recovering component disposed between the first pivoting joint and the moving component for driving the moving component to recover.

* * * * *